US012632725B2

(12) United States Patent
Bhardwaj et al.

(10) Patent No.: US 12,632,725 B2
(45) Date of Patent: May 19, 2026

(54) GENERATING A NEURAL NETWORK MODEL USING REDUCIBLE BLOCKS

(71) Applicant: Arm Limited, Cambridge (GB)

(72) Inventors: Kartikeya Bhardwaj, San Jose, CA (US); Naveen Suda, Fremont, CA (US); Lingchuan Meng, Santa Clara, CA (US); Alexander Eugene Chalfin, Mountain View, CA (US); Danny Daysang Loh, Menlo Park, CA (US)

(73) Assignee: Arm Limited, Cambridge (GB)

( * ) Notice: Subject to any disclaimer, the term of this patent is extended or adjusted under 35 U.S.C. 154(b) by 1173 days.

(21) Appl. No.: 17/559,163

(22) Filed: Dec. 22, 2021

(65) Prior Publication Data

US 2023/0196093 A1    Jun. 22, 2023

(51) Int. Cl.
*G06N 3/08* (2023.01)

(52) U.S. Cl.
CPC ..................................... *G06N 3/08* (2013.01)

(58) Field of Classification Search
CPC ...................................................... G06N 3/08
See application file for complete search history.

(56) References Cited

PUBLICATIONS

Liu et al., Post-training Quantization with Multiple Points: Mixed Precision without Mixed Precision; arXiv: 2002.09049v1 [cs.LG] Feb. 20, 2020; Total pp. 14 (Year: 2020).*

Yan et al., An FPGA-based MobileNet Accelerator Considering Network Structure Characteristics; 2021 31st International Conference on Field-Programmable Logic and Applications (FPL); pp. 17-23 (Year: 2021).*

Zhou et al., Rethinking Bottleneck Structure for Efficient Mobile Network Design; arXiv:2007.02269v4 [cs.CV] Nov. 27, 2020; Total pp. 24 (Year: 2020).*

Howard, Andrew G., et al. "Mobilenets: Efficient convolutional neural networks for mobile vision applications." arXiv preprint arXiv:1704.04861 (2017).

Sandler, Mark, et al. "Mobilenetv2: Inverted residuals and linear bottlenecks." Proceedings of the IEEE conference on computer vision and pattern recognition. 2018.

Cai, Han, Ligeng Zhu, and Song Han. "Proxylessnas: Direct neural architecture search on target task and hardware." arXiv preprint arXiv:1812.00332 (2018).

He, Kaiming, et al. "Deep residual learning for image recognition." Proceedings of the IEEE conference on computer vision and pattern recognition. 2016.

(Continued)

*Primary Examiner* — Alan Chen

(74) *Attorney, Agent, or Firm* — Pearl Cohen Zedek Latzer Baratz LLP

(57) ABSTRACT

Disclosed is a novel neural network architecture and methods for generating neural network-based models from such architecture. A first version of the neural network, that is used for training purposes, includes one or more blocks in a first format that can then be replaced with corresponding blocks in a second format for execution. An executable model can thus be provided comprising a second version of the neural network including the one or more blocks in the second format. This then allows the training to be performed in a first, e.g. expanded format, but with a second, e.g. reduced, format model then provided for execution.

16 Claims, 12 Drawing Sheets

(56) References Cited

PUBLICATIONS

Zagoruyko, Sergey, and Nikos Komodakis. "Wide residual networks." arXiv preprint arXiv:1605.07146 (2016).

Yin, Wei, et al. "Enforcing geometric constraints of virtual normal for depth prediction." Proceedings of the IEEE/CVF International Conference on Computer Vision. 2019.

Kupyn, Orest, et al. "Deblurgan-v2: Deblurring (orders-of-magnitude) faster and better." Proceedings of the IEEE/CVF International Conference on Computer Vision. 2019.

Osokin, Daniil. "Real-time 2d multi-person pose estimation on CPU: Lightweight OpenPose." arXiv preprint arXiv:1811.12004 (2018).

Mathis, Alexander, et al. "Pretraining boosts out-of-domain robustness for pose estimation." Proceedings of the IEEE/CVF Winter Conference on Applications of Computer Vision. 2021.

Lin, Ji, Chuang Gan, and Song Han. "Tsm: Temporal shift module for efficient video understanding." Proceedings of the IEEE/CVF International Conference on Computer Vision. 2019.

Tan, Mingxing, and Quoc Le. "Efficientnet: Rethinking model scaling for convolutional neural hetworks." International Conference on Machine Learning. PMLR, 2019.

Xiong, Yunyang, et al. "Mobiledets: Searching for object detection architectures for mobile accelerators." arXiv preprint arXiv:2004.14525 (2020).

Guo, Shuxuan, Jose M. Alvarez, and Mathieu Salzmann. "ExpandNets: Linear Over-parameterization to Train Compact Convolutional Networks." arXiv preprint arXiv:1811.10495 (2018).

* cited by examiner

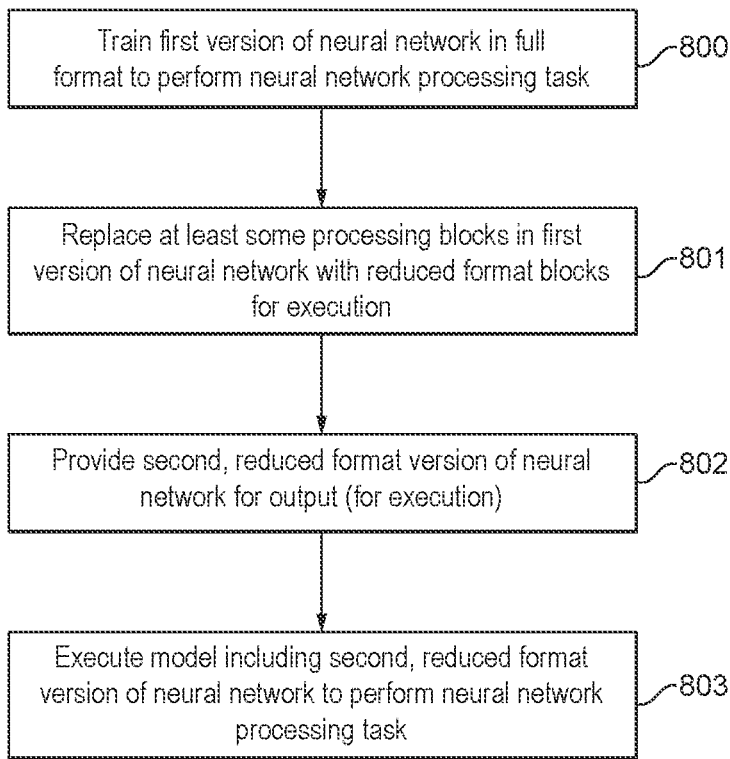

Train first version of neural network in full format to perform neural network processing task ~800

Replace at least some processing blocks in first version of neural network with reduced format blocks for execution ~801

Provide second, reduced format version of neural network for output (for execution) ~802

Execute model including second, reduced format version of neural network to perform neural network processing task ~803

FIG. 8

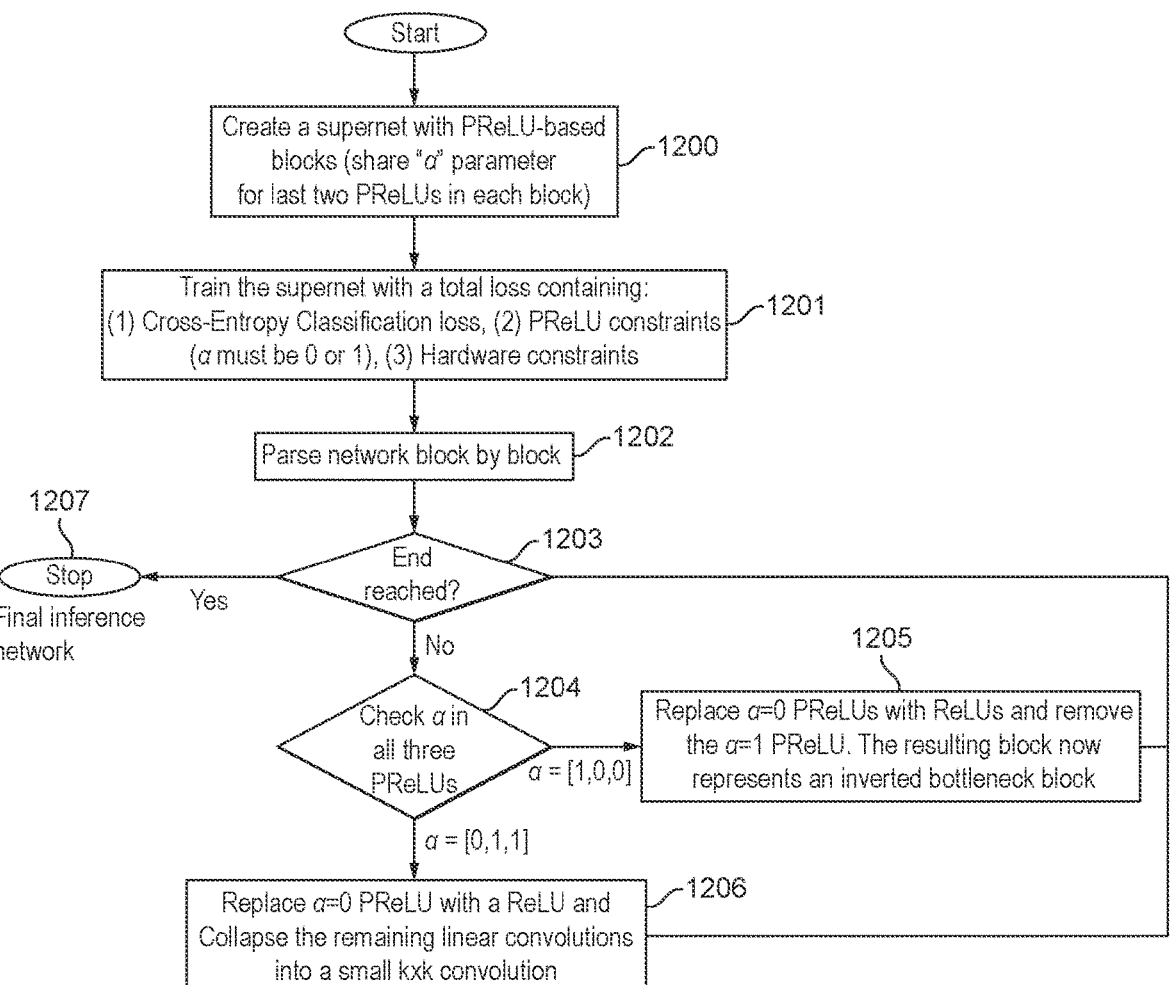

Start

Create a supernet with PReLU-based
blocks (share "α" parameter
for last two PReLUs in each block)          1200

Train the supernet with a total loss containing:
(1) Cross-Entropy Classification loss, (2) PReLU constraints
(α must be 0 or 1), (3) Hardware constraints          1201

Parse network block by block          1202

1207

Stop
Final inference
network

Yes          End
reached?          1203

No

Check α in
all three
PReLUs          1204

α = [1,0,0]

Replace α=0 PReLUs with ReLUs and remove
the α=1 PReLU. The resulting block now
represents an inverted bottleneck block          1205

α = [0,1,1]

Replace α=0 PReLU with a ReLU and
Collapse the remaining linear convolutions
into a small kxk convolution          1206

FIG. 12

GENERATING A NEURAL NETWORK MODEL USING REDUCIBLE BLOCKS

BACKGROUND

The technology described herein relates to neural networks, and in particular to neural networks that can provide relatively higher accuracies (for their size) and that can be more efficiently executed, e.g., and in an embodiment, on hardware accelerators such as neural processing units (NPUs).

Neural networks can be used for processes such as machine learning, computer vision, and natural language processing operations. A neural network may operate upon suitable input data (e.g. such as an image or sound data) to ultimately provide a desired output (e.g. an identification of an object within an image, or a spoken word within a sound clip, or other useful output inferred from the input data). This process may comprise an "inferencing" or "classification" process but there are various types of network that may be executed to perform different operations, as desired.

A neural network will typically process the input data (e.g. image or sound data) according to a network of operators, each operator performing a particular operation. The operations will generally be performed sequentially to produce desired output data (e.g. a classification based on the image or sound data). Each operation may be referred to as a "layer" of neural network processing.

Hence, neural network processing may comprise a sequence of "layers" of processing, such that the output from each layer is used as an input to a next layer of processing. FIG. 1 shows an exemplary sequence of layers of neural network processing from an initial input layer 101 to a final output layer 107, between which are layers comprising various convolutional layers (C-layers) 102, 103, 104, and fully-connected layers (FC layers) 105, 106.

The input layer 101 may be configured to receive input data (e.g. image or sound data), and to provide that input data in a suitable form (e.g. as an array of data elements, otherwise known as a "feature map") for use by subsequent neural network layers. The feature map will generally comprise a three-dimensional array of data elements, each data element having data associated therewith. The feature map may have a width (W), a height (H) and a depth (C), wherein the width (W) and height (H) may be defined as the number of data elements in the width and height direction respectively, and the depth (C) may correspond to a number of data channels. For example, in the case of input data comprising an image, the width and height of the array provided by the input layer may correspond to a number of data positions (e.g. pixels) along the width and height direction of the image respectively, whilst the channels may comprise the RGB channels of the image.

After the input layer, there may be one or more other layers of neural network processing (e.g. including convolutional layers, fully-connected layers, pooling layers, deconvolution layers, or any other layers of neural network processing that may be present).

Generally, a layer of neural network processing will process an input feature map (IFM) in order to generate a corresponding output feature map (OFM) (e.g. in the case of a convolutional layer, deconvolution layer, or pooling layer), or output value (e.g. a probability in the case of a fully-connected layer). The output generated by a layer of neural network processing may be used as the input for a next layer of neural network processing in the sequence, and so on. This is illustrated in FIG. 2.

The operation performed by each layer of neural network processing may comprise any suitable operation which manipulates an input (feature map) to provide an output (feature map). The operation may require process parameters (e.g. such as weights for a filter or "kernel") which may be specific to a particular layer of neural network processing. Hence, as shown in FIG. 2, suitable process parameters (e.g. weights and biases) may be read from working memory (e.g. a buffer) 201 in order to perform each layer of neural network processing.

With reference to FIG. 1, the final layer of neural network processing in the sequence may comprise an output layer 107. The output layer may process an input feature map to generate useful output data (e.g. an inference or classification result, or an output image in the case of image processing, etc.).

Typically, data corresponding to an output feature map generated by a layer of neural network processing may be written to a suitable working memory (e.g. a buffer) 202, as shown in FIG. 2. A next layer of neural network processing may then read that data from the buffer 202 for use as an input feature map for said next layer of neural network processing.

Conceptually, when describing a neural network, a number of processing operations, e.g. layers, are often grouped together, as a "block". A neural network block may thus represent a single layer, or more typically a sequence of multiple layers. This abstraction into blocks can facilitate a more compact representation of the network (e.g. in software code), as the neural network can be considered in terms of such blocks, rather than in terms of the individual layers.

Whilst FIG. 1 shows an example of a particular convolutional neural network with a certain arrangement of processing layers, it will be appreciated that a neural network may have various other layer arrangements and/or network architectures (e.g. the neural network could use a recurrent rather than convolutional neural network architecture).

Generally speaking, neural network processing involves performing various tensor arithmetic operations. For example, when applying a filter to an input data array, the processing may comprise performing weighted sums according to a "multiply-accumulate" (MAC) operation.

This processing can be performed by various processing elements, as desired. For example, graphics processors (graphics processing units, GPUs) are often re-purposed for neural network processing. It is also possible to execute neural network processing using a general purpose processor, such as a central processing unit (CPU). However, to facilitate the neural network processing, in some data processing systems, as shown in FIG. 3, a dedicated neural processing unit (NPU) 306 is provided as a hardware accelerator that is operable to perform such neural network processing as and when desired, e.g. in response to an application that is executing on a host processor (e.g. central processing unit (CPU)) 305 requiring the neural network processing.

For instance, an NPU 306 may be provided along the same interconnect (bus) 307 as other hardware accelerators, such as a graphics processor (graphics processing unit, GPU) 304, such that the host processor (CPU) 305 is operable to request the NPU 306 to perform a set of neural network processing operations accordingly, e.g. in a similar manner as the host processor 305 is able to request the graphics processor 304 to perform graphics processing operations. The NPU 306 is thus a dedicated hardware unit for performing neural network processing operations on request by the host processor (CPU) 305.

A neural processing unit (NPU) may therefore (and generally does) comprise hardware (for example comprising processing circuits) which is constructed for more efficiently performing neural network processing operations of a particular type. For example, the NPU 306 may comprise a plurality of multiply-accumulate circuits 306A (otherwise known as a multiplier-accumulators, or "MAC units") which are configured to perform MAC operations. The NPU 306 may be optimised for performing certain types of operation that are commonly used when processing a neural network, e.g. such that there is higher MAC unit utilisation when performing these types of operation.

A benefit of providing an NPU is therefore that at least these types of operations can then be performed in a more optimised manner, e.g. compared to using another processor (e.g. the CPU) to perform the calculations in a general purpose manner. This also then frees up other components (e.g. the host processor (CPU)) to perform other processing tasks, as desired, which may improve the overall processing efficiency. This can be particularly important for resource constrained devices, such as mobile devices, where the CPU resource may be limited.

In order to use a neural network to perform desired neural network processing work (which may, e.g., be an inference or classification task, as mentioned above), it is necessary to 'train' the neural network in order to determine and/or update the neural network parameters (e.g. weights) accordingly for the neural network processing task. This training process typically involves using a training dataset, which may, e.g., comprise a set of suitably labelled input-output pairs (at least where the training is to be performed in a supervised manner, although other (e.g. unsupervised) arrangements are also possible). The training process then involves using an optimisation algorithm to explore the neural network parameter space to determine a set of neural network parameters (weights) that result in a desired accuracy performance on the training dataset, e.g. that best map a set of input features in the training dataset to the corresponding output. Once the training process is complete, and a set of neural network parameters (weights) that give a sufficiently good accuracy performance on the training dataset is thereby determined, the trained neural network (that is, the neural network itself and the neural network parameters (weights) that have been determined by the training process), can then be provided for output as an executable model.

The executable model including the trained neural network can thus be executed by a suitable processor, as and when desired, in order to perform a neural network processing task (that the neural network has been trained for).

For example, when it is desired to perform neural network processing in respect of a particular input (e.g. an image that is to be classified, etc.), the executable model may be provided with an appropriate input, and the model (the trained neural network) then executed accordingly to perform the desired neural network processing on the input to give a corresponding output.

As mentioned above, there are various examples of different neural network architectures. One example of a convolutional neural network that is particularly efficient for mobile and other resource-constrained environments is the so-called "MobileNetV2" architecture, as described in Sandler et al. "MobileNetV2: Inverted Residuals and Linear Bottlenecks"; Proceedings of the IEEE conference on computer vision and pattern recognition, 2018. The MobileNetV2 architecture is particularly tailored for image classification such as for computer vision applications.

The MobileNetV2 model structure is based on a sequence of "inverted bottleneck" ("IBN") blocks, each comprising a set of inverted bottleneck convolution operations that act to expand an input to the block to a higher dimension for processing, before then reducing to a lower dimension for output. These blocks, which will be referred to herein as "traditional" inverted bottleneck (IBN) blocks, represent a specific sequence of operations as shown in Table 1 below (reproduced from Sandler et al.):

TABLE 1

| Inverted bottleneck transforming from k to k' channels, with stride s, and expansion factor t. | | |
| --- | --- | --- |
| Input | Operator | Output |
| $h \times w \times k$ | $1 \times 1$ conv2d, ReLU6 | $h \times w \times (tk)$ |
| $h \times w \times tk$ | $3 \times 3$ dwise s = s, ReLU6 | $\frac{h}{s} \times \frac{w}{s} \times (tk)$ |
| $\frac{h}{s} \times \frac{w}{s} \times tk$ | linear $1 \times 1$ conv2d | $\frac{h}{s} \times \frac{w}{s} \times k'$ |

The traditional inverted bottleneck (IBN) blocks used in MobileNetV2 thus take as input an array of size $h \times w$, with kernel size k, and then performs a specific sequence of inverted bottleneck convolution operations including first expanding the input features to a higher dimension by performing a $1 \times 1$ convolution (expansion), and then performing a $3 \times 3$ depthwise separable convolution in the higher dimension space, before reducing the features back to a lower-dimensional representation, by performing another $1 \times 1$ convolution (reduction).

In order to provide the desired non-linearity, various activation functions are also applied within the IBN block. The MobileNetV2 IBN block shown in Table 1 thus comprises applying rectified linear unit (ReLU) activation functions after both the first expansion and the depthwise separable convolution (in particular a ReLU6 activation function, which is a modified ReLU with the activation limited to a maximum size of 6). However, other non-linear activation functions may also be applied as desired.

FIG. 4 schematically shows the overall structure of a MobileNetV2 model. As shown in FIG. 4, the MobileNetV2 model contains an initial full convolution layer 401 with 32 filters, followed by a series of IBN blocks 402 of the type described above (with generally increasing numbers of filters). In the final few layers of the network, another expansion operation 403 is performed to expand the features to a higher dimension, followed by a pooling layer 404, and a fully connected layer 405 that processes the features in the higher dimension and provides an output set of features that are used to give the final classification result 406. FIG. 4 also shows in more detail the structure of a single IBN block 402, as well as the details of the final layers of the network.

As mentioned above, the MobileNetV2 architecture is particularly suited for mobile and other resource-constrained applications, as it can provide higher classification accuracy using a relatively compact network. This is primarily due to the use of the IBN blocks as these significantly decrease the number of processing operations and memory needed to achieve a desired accuracy. In particular, both the $1 \times 1$ convolutions that perform the expansion/reduction operations defining the inverted bottleneck and the $3 \times 3$ depthwise separable convolution that is performed within the inverted bottleneck can be efficiently performed using a general purpose processor, such as a CPU, e.g. using standard operations, and requiring relatively fewer model parameters and MAC operations.

For these reasons, MobileNetV2 networks, and other network architectures using similar IBN blocks, are increasingly used as the basis for models for classification or inference processes, especially for mobile devices. For instance, although these IBN blocks are a particular feature of MobileNetV2, there are also other neural network architectures that use similar IBN blocks (such as MobileNetV3, EfficientNets, etc.), and that have been used as the basis for models for similar neural network processing applications as MobileNetV2.

Despite the successes that have been achieved by executing MobileNetV2-based models using mobile device CPUs, the Applicants have found that there can however be difficulties in efficiently running such networks on existing hardware accelerators such as neural processing units (NPUs), such that the benefits that are provided by using such neural networks are mitigated when attempting to offload MobileNetV2 (and similar) neural network processing to an NPU.

The Applicants believe therefore that there remains scope for improvements to the processing of neural networks.

In particular, the Applicants believe that there remains scope for improved neural network architectures that can be more efficiently executed whilst still providing desired accuracies.

BRIEF DESCRIPTION OF THE DRAWINGS

Embodiments of the technology described herein will be described, by way of example only, with reference to the accompanying drawings in which:

FIG. 8 shows schematically the overall training and execution of a neural network according to an embodiment;

FIG. 12 shows schematically the construction of a neural network according to an embodiment.

DETAILED DESCRIPTION

Figure 1:
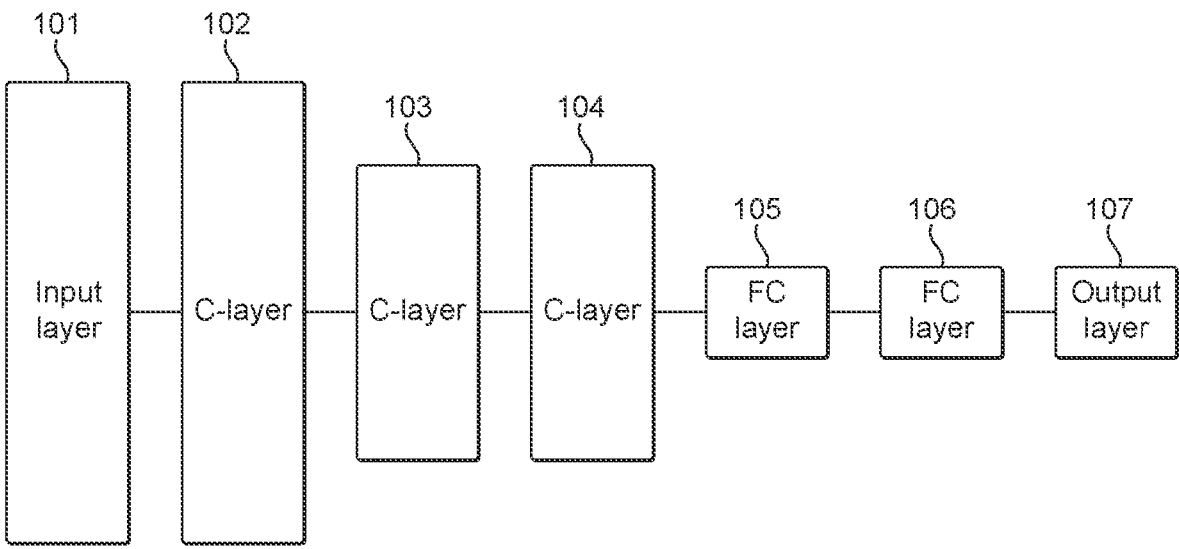
FIG. 1 shows an exemplary sequence of layers of neural network processing comprising an input layer and an output layer, between which are neural network layers comprising various convolutional layer (C-layer) layers and fully-connected layers (FC layer)
Figure 2:
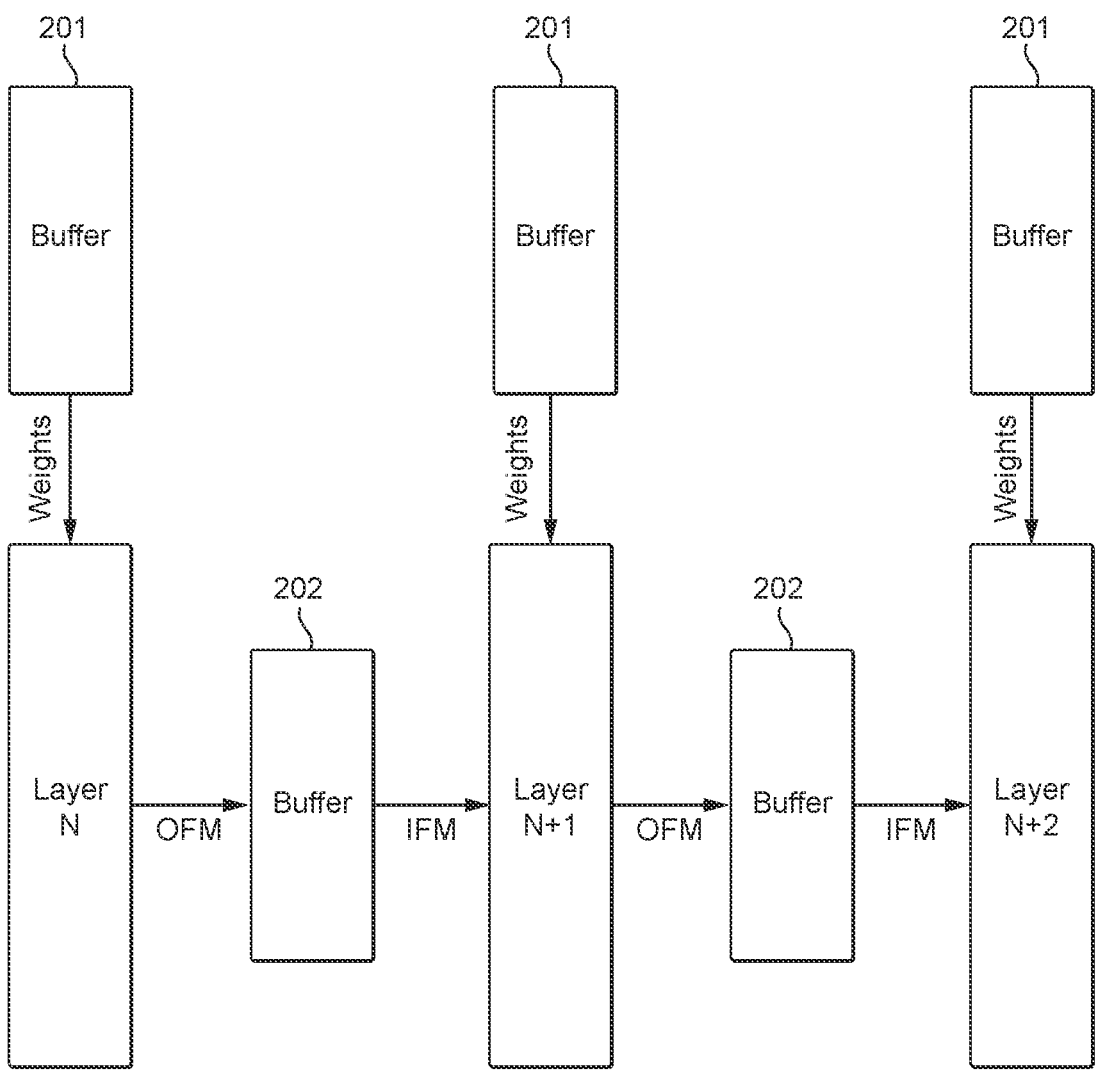
FIG. 2 illustrates a sequence of layers of neural network processing, wherein the output feature map from a layer of neural network processing may be written to a suitable buffer and then use as an input feature map for a next layer in the sequence, and wherein each layer of neural network processing may use processing parameters (e.g. such as weights) which are read from a suitable buffer.

A first main embodiment of the technology described herein comprises a method of generating a model that can be executed by a processor to perform neural network processing, the method comprising:

providing a neural network, the neural network including a plurality of layers that are together arranged to process an input to the neural network to generate a respective output, wherein the neural network comprises a number of blocks, each block comprising one or more layers of the neural network, and each block configured to perform a respective sequence of processing operations;

training the neural network to perform a neural network processing task, wherein training the neural network comprises training a first version of the neural network, the first version of the neural network including one or more blocks in a first format, wherein each block in the first format comprises a respective sequence of processing operations;

after training the first version of the neural network:
replacing one or more of the first format blocks in the trained neural network with corresponding blocks in a second, different (reduced) format to generate a second version of the neural network for execution, the second version of the neural network thus including a respective one or more blocks in the second format, wherein the blocks in the second format when executed replicate the result of the sequence of processing operations for the corresponding first format blocks in the trained neural network; and providing for output an executable model comprising the second version of the neural network including the one or more blocks in the second format.

The technology described herein generally relates to neural networks, and in particular to improved neural network-based models that can be more efficiently executed by a desired processing element. For example, in some embodiments, the technology described herein provides neural network-based models that can be more efficiently executed on constrained hardware units, such as neural processing units (NPUs). However, it will be appreciated that the technology described herein can generally be used to optimise neural network execution for any desired processing element.

In the technology described herein, a neural network is trained to perform a neural network processing task, and an executable model is generated based on the trained neural network, which model can then be executed, as desired, by a processor to perform neural network processing tasks.

Thus, a neural network is provided for training, which neural network is then suitably trained to perform a desired neural network processing (e.g. inference or classification) task. The training process may, and in an embodiment does, involve determining parameters (weights) for the neural network, e.g., that best map input features to a corresponding desired output for performing the neural network processing task, e.g., in the normal manner for training a neural network.

After the neural network has been appropriately trained, and suitable parameters (weights) thereby determined for each of the processing layers, the trained neural network (that is the neural network itself as well as the neural network parameters (weights) determined by the training process) can then be provided for output (for execution) as an executable model, which model can then be executed as desired to perform the neural network processing tasks that the neural network was trained for.

The executable model, including the neural network and its associated trained parameters (weights), can thus be provided to a suitable processor for execution, and then executed by the processor accordingly, in order to perform neural network processing, as desired. For instance, when it is desired to perform a neural network processing task on a given input (or set of input features), the input (features) can be (and are) provided as input to the model, with the model then being executed accordingly to perform the neural network processing to process the input (features) into a respective output (which may, e.g., comprise an inference/classification result, or a set of output features, depending on the neural network and neural network processing task in question).

According to the technology described herein, however, after the neural network has been suitably trained, rather than simply using (executing) the trained neural network 'as is' (i.e. in the first format in which the neural network was trained), at least some of the processing blocks in the trained version of the neural network are replaced in the version of the neural network that is to be executed with corresponding different format blocks for execution, e.g., and in an embodiment, to facilitate a more efficient execution.

Thus, in the technology described herein, the version of the neural network that is used for the training process includes a number of blocks that, as will be explained further below, can be analytically transformed from a first (e.g. 'full') format in which the block comprises a respective first sequence of (plural) processing operations into a second, different (e.g., and in an embodiment, 'reduced') format for execution. The second (reduced) format version of the block thus comprises a respective second sequence of processing operations that when executed replicates the result of the respective full sequence of processing operations in the first format, but in an embodiment can be more efficiently executed (e.g. compared to the first format version of the block).

For example, and in some embodiments, the executable model including the trained neural network is designed to be (and in an embodiment is) executed on a dedicated neural network processing hardware accelerator, such as an NPU, which hardware accelerator (NPU) is configured to optimally perform certain types of processing operations, e.g. that are commonly required for neural network processing (e.g., and in an embodiment, certain types of "regular" (e.g. regular 3×3) convolution operations).

Thus, in embodiments, the model is provided to a neural network processing hardware accelerator, e.g. NPU, for execution (and executed by the hardware accelerator accordingly when it is desired to perform an inference or classification task).

In embodiments, the second (reduced) format version of a block thus includes a set of one or more operations of a (or the) type that the hardware accelerator is configured to perform, such that the hardware accelerator is operable to execute the model including the blocks in the second (reduced) format in a more efficient or optimised manner, e.g. with higher utilisation of the hardware processing circuitry (e.g. higher utilisation of an NPU's MAC units) than if using (executing) the blocks in the first, non-reduced format.

Accordingly, in embodiments, the model is designed to be executed on a neural network processing hardware accelerator, the hardware accelerator being configured to more (or most) efficiently perform certain types of operations, and the second (reduced) format version of a block comprises a set of operations of a type that the hardware accelerator is configured to more (or most) efficiently perform.

(Whilst in particularly embodiments, at least some of the blocks in the trained version of the neural network are replaced in the execution version of the neural network with blocks that are easier to execute using a hardware accelerator (such as an NPU), as described above, and the technology described herein will therefore primarily be described in the context of such arrangements, it will be appreciated that there may also be other situations where replacing neural network processing blocks in a first format with blocks in another, different format for execution may be beneficial, for other reasons. That is, the idea to use different versions of a neural network for training and for execution may provide various benefits in terms of optimising the overall training and execution of the model that are not limited (solely) to improving hardware (NPU) execution. Correspondingly, whilst in some embodiments the execution version of the neural network is designed to be (and is) executed by a hardware accelerator (such as an NPU), it will be appreciated the execution of the neural network may be performed by any suitable processor (such as a graphics processor (graphics processing unit, GPU), a central processor (central processing unit, CPU), etc.), as desired, and the neural networks of the technology described herein may still provide benefits in that context in terms of an improved execution.)

Subject to the blocks in the first (full) format being able to be transformed into blocks in a second (reduced) format for execution in the manner described above, with the blocks in the second format suitably replicating the processing result of the block in the first (full) format, the blocks in the first (full) format are otherwise less constrained in terms of which processing operations they may include, e.g. as the training process will generally be performed in advance (and offline), and can therefore be performed using any suitable and desired processor(s). The sequence of operations within a processing block in the first (full) format can therefore include more complex (and greater numbers of) processing operations, e.g. that may be less efficiently executable, without significant penalty.

The blocks in the second (reduced) format then replicate the result of the full sequence of operations that are defined for the blocks in the first format but in an embodiment include processing operations that can be more efficiently executed by the hardware accelerator. For example, where the full sequence of operations included in a block in the first (full) format is configured to take a set of k input features and then perform a sequence of processing operations to process these to a set of k' output features, the second (reduced) format version of the block will be similarly configured to process a set of k input features to a set of k' output features, but by applying a different (reduced) sequence of operations that replicate the result of the full sequence of processing operations, e.g. as will be explained further below.

For instance, the first (full) sequence of processing operation in the trained version of the neural network may involve performing a first (full) set of tensor multiplications or convolutions, with the tensor values set based on the neural network parameters (weights) determined by the training process. In the second (reduced) format, the first (full) set of tensor multiplications or convolutions may be analytically collapsed into a second (reduced) set of tensor multiplications or convolutions, e.g., and in an embodiment, a single tensor multiplication. The tensor values for the second (reduced) tensor multiplication or convolution (or set thereof) (i.e. that represent the neural network parameters (weights) for the block in the second format) may thus be determined by suitably merging or collapsing the tensors in the first (full) sequence of tensor multiplications or convolutions.

Thus, in embodiments, a set of first plural processing operations defined for the blocks in the first format (for training) is replaced in the second format version of the block with a corresponding set of second plural processing operations, wherein the number of processing operations in the second format version of the block is reduced compared to the first format version of the block. That is, the second format version of the block in an embodiment comprises fewer processing operations than the first format version of the block. In an embodiment a sequence of plural processing operations in the first format version of the block are reduced to a single processing operation for the second format version of the block (for execution).

The neural network in the technology described herein can thus be (and is) trained using blocks in the first (full) format, using the full sequence of operations that are defined for the blocks in the first format. This means that the model (neural network) can be trained to a higher degree of accuracy (e.g. compared to training a version of the neural network using the reduced format blocks).

However, after the neural network has been suitably trained, and the trained neural network is to be output for execution as part of an executable model (that can subsequently be executed as desired to perform neural network processing tasks), at least some of the first (full) format blocks in the version of the neural network that was trained are replaced in the version of the neural network for execution by corresponding blocks in the second (reduced) format.

In this way, by training a neural network in its 'full' or expanded format (the first format), but then replacing some of the blocks in the neural network with corresponding 'reduced' format blocks for execution, the Applicants have found that it is possible to achieve higher accuracy performance using a neural network model that can be more efficiently executed, and without significantly increasing the size of the neural network.

In particular, the Applicants have found that by training a neural network according to the technology described herein in its full format, it is possible to achieve higher neural network processing accuracies (e.g. higher classification or inference accuracies) (e.g. compared to training the model in the reduced format), and further that it is possible to then replace the full format version of the neural network with a reduced format version for execution, without loss of accuracy.

That is, the Applicants have found that by training a neural network using suitably constructed transformable, or 'reducible', blocks that can be replaced at execution time with corresponding blocks in a second (reduced) format, even when the blocks are then replaced at execution time with the corresponding reduced format blocks for execution, it is still possible to retain a desired accuracy from the training process.

In other words, the use of blocks in different formats in the neural network (model) for the training and execution processes allows for a more optimised overall model generation, e.g., and in an embodiment, with the training being performed using a fuller model to provide a desired accuracy, but a 'reduced' format (simpler) version of the model then being provided for output (for execution), to allow a more efficient execution (e.g. compared to executing the model including (all of) the blocks in the first (full) format).

For instance, as mentioned above, the neural network-based models of the technology described herein may be (and in an embodiment are) optimised for execution by a neural network processing hardware accelerator, such as an NPU.

An NPU is typically (and in embodiments) configured to perform certain types of operations that are commonly encountered during neural network processing. A neural processing unit (NPU) may therefore (and in an embodiment does) comprise hardware (for example comprising processing circuits) which is constructed for most efficiently performing neural network processing operations of a particular type. For example, the NPU may, e.g., and in an embodiment does, comprise one or more, and in an embodiment a plurality of, multiply-accumulate circuits (otherwise known as multiplier-accumulators, or "MAC units") which are configured to perform weighted sums according to a "multiply-accumulate" (MAC) operation when applying a filter to an input data array.

The NPU is in an embodiment optimised for performing certain types of operation, e.g. that are commonly used when processing a neural network. For example, an NPU may be configured and optimised to more (most) efficiently perform "regular" (e.g. regular 3×3) convolutions. The NPU may therefore be capable of performing these processing operations very efficiently, with higher utilisation of the processing circuits (e.g. MAC units) of the NPU.

However, the Applicants have recognised that the utilisation of the NPU may typically be significantly lower when attempting to process other operators.

In particular, the Applicants have found that the NPU utilisation is relatively poor when executing the traditional inverted bottleneck (IBN) blocks that characterise the MobileNetV2 model.

This means that even though the use of IBN blocks can help reduce the overall number of processing operations within the model (compared to other networks that do not use inverted bottlenecks), and these IBN blocks can typically be processed efficiently on a general purpose processor (e.g. using a CPU), attempting to execute these IBN blocks on existing NPUs can often introduce a significant performance pinch point, thus mitigating the benefits of using the IBN blocks in the first place.

The Applicants have found that similar execution problems exist with the final layers in the MobileNetV2 model, which have a large computational cost, and require significant bandwidth, and may therefore be difficult to execute, especially using a constrained NPU (but also generally).

The technology described herein thus recognises that it would be beneficial to be able to provide similar neural network-based models, e.g. that are capable of achieving similar accuracy, to MobileNetV2, but that can be executed in a more efficient manner, e.g., and in an embodiment, by neural network processing hardware accelerators (e.g. an NPU), e.g., and in an embodiment, with better utilisation of the hardware accelerator (NPU) processing circuitry.

To address this, as explained above, the technology described herein thus proposes a new neural network architecture, which is based on a number of novel neural network processing blocks that can be transformed from a first (full) format that is used for training purposes, to achieve a desired accuracy, into a reduced format for execution, e.g. to achieve a more efficient execution.

A neural network according to the technology described herein, at least in its 'full' version (the version that will be trained), may, e.g., and in an embodiment does, thus include a number of different 'reducible' blocks that are used in a first (full) format for the training process but which can then be (and are) replaced with suitably reduced format versions of the blocks for execution.

(There may of course also be other, non-reducible blocks in the neural network, if that is desired. Various arrangements would be possible in this regard when deciding the arrangement of which blocks to include within a neural network, as will be explained further below.)

An aspect of the technology described herein is thus the construction of novel types of neural network processing blocks that can be analytically transformed in the manner described above.

For instance, in an embodiment, the overall neural network structure is similar in design to MobileNetV2 (which is based on a sequence of IBN blocks, as described above) but at least some of the IBN blocks in the MobileNetV2 model are in an embodiment replaced with 'reducible' inverted bottleneck blocks that can be transformed from a first (full) format that is used for training and that comprises a sequence of 'inverted bottleneck' operations into a second (reduced) format for execution. The inverted bottleneck blocks according to an embodiment in the first (full) format thus perform a similar set of convolution operations to the IBN blocks in MobileNetV2, including the 'inverted bottleneck' processing, but are constructed in such a manner that the sequence of convolution operations represented by an inverted bottleneck block can be replaced in the output model (i.e. the model that is used at execution time) with a (reduced) set of one or more "regular" convolution operations of a type that can be more efficiently processed (e.g. regular 3×3 convolutions).

Furthermore, this replacement is done in such a way that the model still retains suitably high accuracy, and without significantly increasing the size of the model.

Specifically, according to an embodiment, the neural network that is provided for training includes one or more (and in an embodiment a plurality of) 'reducible' inverted bottleneck blocks that in the first (full) format include a set of (inverted bottleneck) convolution operations including an expansion operation that expands a set of k features to a higher dimension (e.g., and in an embodiment, by applying a 1×1 convolution), a depthwise separable convolution in the higher dimension, and a reduction operation that reduces the features from the higher dimension to an output set of k' features (e.g., and in an embodiment, by applying another 1×1 convolution).

It will be appreciated that the reducible inverted bottleneck blocks of the technology described herein thus in an embodiment perform a similar (the same) sequence of (inverted bottleneck) convolution operations as an IBN block within the MobileNetV2 architecture.

(Thus, in embodiments, the overall neural network is similar in form to a MobileNetV2 model, but with at least some of the traditional IBN blocks in the MobileNetV2 model replaced with the 'reducible' inverted bottleneck blocks of the technology described herein.)

In contrast to traditional IBN blocks, however, the 'reducible' inverted bottleneck blocks according to the embodiments of the technology described herein are constructed in such a manner that the block can be analytically collapsed from its first (full) format including the full sequence of convolution operations described above into a reduced format version of the block that comprises a set of regular (e.g.

regular 3×3) convolutions, the reduced format block therefore being better optimised for execution.

In particular, to facilitate the transformation of the inverted bottleneck blocks from the first (full) format into a reduced format version of the block that replicates the result of the full sequence of operations using a set of one or more regular convolution operations, the set of convolutions included in the inverted bottleneck block (i.e. the expansion, depthwise separable convolution and reduction operations that comprise the 'inverted bottleneck' part of the block) is in an embodiment included as part of a sequence of (strictly) linear operations. Any non-linear operations, such as non-linear activation functions (e.g. a ReLU activation function), that are to be applied within the block, are therefore in an embodiment applied outside of, and separately to, the sequence of (inverted bottleneck) convolution operations within the inverted bottleneck block. In an embodiment the non-linear activation function is applied immediately before the (inverted bottleneck) convolution operations.

That is, compared to traditional IBN blocks, e.g. as used in MobileNetV2, where the ReLU activation function is applied within the inverted bottleneck, both after the initial expansion to the higher dimension, and after the depthwise separable convolution, the non-linear activation (e.g. ReLU) functions associated with the inverted bottleneck blocks of the technology described herein are placed outside of the sequence of inverted bottleneck convolution operations, in particular such that in the first (full) format, where the features are expanded to a higher dimension and processed in the higher dimension before being reduced back to a lower dimension, the non-linear activation functions are applied outside of, e.g. in an embodiment before, the expansion into the higher dimension.

This means that the inverted bottleneck blocks of the technology described herein can be analytically collapsed in a manner that is not possible with traditional IBN blocks. For instance, the ReLU activation function is a piecewise function that will output the input directly if it is positive, otherwise, it will output zero. In traditional IBN blocks this non-linearity is therefore applied within the inverted bottleneck, after each convolution operation.

The present Applicants have however recognised that this non-linearity can, at least in some cases, be moved outside the sequence of inverted bottleneck convolutions (whilst still retaining sufficient accuracy), and further that by moving the non-linear activation function outside of the sequence of convolution operations comprising the inverted bottleneck it then becomes possible to transform the sequence of inverted bottleneck convolution operations within the inverted bottleneck block into a set of "regular" convolution operations, e.g. of a type that the hardware accelerator (NPU) is optimised to perform, e.g. regular 3×3 convolutions, without loss of accuracy at execution time.

By including the set of convolutions comprising the inverted bottleneck part of the block as part of a sequence of linear operations, it is thus possible to analytically collapse, e.g. merge, the sequence of linear operations including the set of inverted bottleneck convolutions into a set of one or more regular convolutions that replicate the result of the full sequence of operations.

The analytical transform thus effectively merges or collapses the first (full) sequence of processing operations into a reduced set of processing operations. Correspondingly, the neural network parameters (weights) for the processing operations (layers) in the first format block can be merged or collapsed in a similar fashion to suitably transform the neural network parameters (weights) determined by the training process for the processing operations (layers) in the first format block into a set of neural network parameters (weights) for the second format block. For example, the processing operations typically involve matrix multiplications, with the matrix values representing the neural network parameters (weights) to be applied. The analytical transform may thus effectively replace the matrices in the first sequence of matrix multiplications with a different set of matrices, representing different processing operations (e.g. representing a regular 3×3 convolution), in particular by merging some of the processing operations (matrices) together, as will be described further below. This can be done due to the linearity of the processing operations.

In contrast, in traditional MobileNetV2 IBN blocks, because the non-linear ReLU activation functions are applied within the inverted bottleneck operations, such that the non-linearity is applied within the sequence of inverted bottleneck operations, the sequence of convolutions defining the inverted bottleneck cannot be analytically transformed in this manner.

Thus, as explained above, a neural network of the technology described herein can then be (and is) trained using the reducible inverted bottleneck blocks in the first (full) format, i.e. using the full sequence of operations represented by the block, including the steps of expanding the input features to a higher dimension, performing a depthwise separable convolution in the higher dimension, and then reducing the features to a lower dimension for output.

Thus, a (and each) 'reducible' inverted bottleneck block may in the first (full) format perform a sequence of processing operations that process a set of k input features into a respective set of k' output features (where k may or may not be equal to k'), but wherein there are a number of intermediate layers that expand the features to a higher dimension, and process the features in this higher dimension. The neural network can then be trained using the blocks in this first (full) format to achieve the desired accuracy. For instance, the expansion of the features into a higher dimension, and processing of the features in the higher dimension, can provide higher accuracies.

On the other hand, as explained above, this sequence of inverted bottleneck convolution operations can be inefficient to execute in hardware processing circuits (e.g. in an NPU) due to the expansion to a higher dimension.

Thus, according to the technology described herein, an inverted bottleneck block may be (and at least some of the inverted bottleneck blocks are) replaced in the version of the model that is provided for output (for execution) with a corresponding reduced format version of the block that similarly processes a set of k input features into a respective set of k' output features, but using a set of one or more "regular" convolution operations (e.g. regular 3×3 convolutions) of a type than can be more efficiently executed in hardware, i.e. without expanding the features to a different dimension.

That is, once the neural network has been trained appropriately for the desired neural network processing task using the blocks in the first (full) format, rather than simply deploying the as-trained version of the neural network for execution, one or more (or all) of the 'reducible' inverted bottleneck blocks are then replaced with corresponding reduced format versions of the blocks for execution. The model including the reduced format version of the neural network can then be executed as desired in order to perform a neural network processing task.

Thus, when the model is executed, at the position of a reduced format inverted bottleneck block, the execution will in an embodiment comprise performing a set of regular (e.g. regular 3×3) convolutions (in an embodiment as well as one or more non-linear activation functions (e.g. ReLU functions) that are applied separately to, e.g. immediately before, the regular convolutions).

Thus, in the reduced format version of the neural network (the execution format), the operations that are executed at the positions of the reduced format inverted bottleneck blocks in an embodiment comprise applying one or more non-linear activation (e.g. ReLU) functions and then performing a set of one or more regular (e.g. regular 3×3) convolutions.

Thus, in embodiments, the neural network includes one or more inverted bottleneck blocks that in the first (full) format are configured to perform a sequence of convolution operations that take a set of k input features, expand the set of k input features to a higher dimension, perform a depthwise separable convolution in the higher dimension, and then reduce the features from the higher dimension to a set of k' output features, and the inverted bottleneck blocks can be transformed from the first format into reduced format blocks for execution, the second (reduced) format version of the inverted bottleneck block comprises a set of one or more regular convolution operations that process a set of k input features into a set of k' output features without expanding the features to a higher dimension.

In embodiments, (in both formats) the reducible inverted bottleneck blocks further comprise a non-linear activation function that is applied separately and outside of the sequence of convolution operations.

In embodiments, the non-linear activation function is a ReLU function. However, other (non-linear) activation functions may also be applied (in both formats), as desired to provide the non-linearity. Some other non-limiting examples of suitable activation functions that may be used to provide the desired non-linearity include Gaussian error linear units (GELUs) or "Swish" functions. Such activation functions may be applied at any suitable location within the inverted bottleneck block, so long as the block can still be suitably transformed from its first (full) format to the second (reduced) format in the manner described above (e.g. so long as any non-linearity is applied outside of the operations that are to be analytically collapsed from the first format to the second format).

In embodiments, one or more batch normalisation operations are also performed. These can be generally be applied at any suitable locations within the block, e.g. since the batch normalisation is a linear function. Any other suitable functions or operations may be applied, as desired.

The effect of all this is then to provide a more execution-friendly version of the neural network for execution, e.g., and in an embodiment, that can be more efficiently executed in hardware. For instance, as mentioned above, the model is in an embodiment executed by a hardware accelerator, such as an NPU, which may be operable and configured to perform certain types of "regular" (e.g. regular 3×3) convolution operations with higher efficiency and utilisation of the hardware accelerator's processing circuitry, but may have a relatively poorer performance when attempting to perform the full sequence of operations in an inverted bottleneck block.

In embodiments, the output features from the (reducible) inverted bottleneck block are then provided to the next layer or block in the neural network.

In some embodiments, the output features are provided directly as input to the next layer or block in the neural network. In other embodiments, at least some of the (reducible) inverted bottleneck blocks comprise 'residual' blocks, wherein the output features are combined with (e.g. added to) the input features, and the combined 'residuals' are then provided to the next layer or block in the neural network.

In the case of a non-residual block, where the block's output is directly provided as output to the next layer (without being combined with the input to the block) the reducible inverted bottleneck block may have the form described above, and may be analytically transformed into a single regular (e.g. regular 3×3) convolution.

In the case of a residual block, however, the reducible inverted bottleneck block may be transformed into a set of two regular (e.g. regular 3×3) convolutions, in an embodiment with an activation function (e.g. ReLU) applied between the sets of convolutions. In that case, in the first (full) format, the inverted bottleneck block may correspondingly comprise a first activation function (e.g. ReLU), a first inverted bottleneck sequence of operations (including expansion, depthwise separable convolution, reduction); a second activation function (e.g. ReLU) and a second inverted bottleneck sequence of operations (including expansion, depthwise separable convolution, reduction). At training time the neural network can accordingly be trained in full. At execution time, however, this reduces to a pair of regular convolutions, each having an associated activation function (ReLU).

Various arrangements would be possible in this regard.

The 'reducible' inverted bottleneck blocks of the technology described herein can be included into a neural network as desired, at appropriate positions within the neural network, e.g. in a similar fashion to the traditional IBN blocks in MobileNetV2.

In addition to using the new reducible inverted bottleneck blocks that can be reduced for execution, e.g. in the manner described above, a similar approach is in an embodiment also used for the final (output) layers of the neural network.

In this regard, the present Applicants have further recognised that the final few (output) layers in MobileNetV2 represent another potential performance pinch point when the model is executed.

For instance, in MobileNetV2, the final few layers of the neural network generally comprise an expansion (1×1 convolution), followed by a sequence of operations consisting of: a batch-normalisation (BN), a ReLU, a pooling (average) layer, and a final fully connected layer. Executing the fully connected layer on an expanded set of features can be computationally very expensive, as this involves a larger number of processing operations to be performed, and the Applicants have found that this can be difficult to do efficiently (whether using dedicated neural network processing hardware (e.g. an NPU), or otherwise).

Thus, in embodiments, the output layers of the neural network in the technology described herein comprise a 'reducible' output block, which in its first (full) format performs similar operations as the output layers in Mobile-NetV2, but can be reduced at execution time to a reduced, more execution-friendly format, in a similar manner as described above for the inverted bottleneck blocks.

In particular, in the first format, the 'reducible' output block of the technology described herein in an embodiment comprises a set of operations including (in sequence): a non-linear activation function (e.g. a ReLU); an expansion operation that expands the input features to a higher dimension (in an embodiment comprising a 1×1 convolution); a batch-normalisation activation function; a pooling (average) layer; and a fully connected layer that is performed in the higher dimension.

Again, because the non-linear activation (ReLU) function is applied outside of, and separately, from the convolution (expansion) operations, this means that the convolution operations can be transformed into a reduced format that can be more efficiently executed in hardware.

For instance, by moving the non-linearity outside of the other operations, it is then possible to analytically reduce the full sequence of operations for the output block into a smaller fully connected layer that can be more efficiently executed in hardware.

In an embodiment this is done by moving the pooling operation outside of the other operations, and then merging the expansion operation with the final fully connected layer. Thus, in the reduced format, the output block in an embodiment comprises a set of operations including (in sequence): applying a non-linear (e.g. ReLU) activation function; performing a pooling operation; and then executing a fully connected layer.

Thus, the output block takes as input a set of m features and processes this into a set of m' output features. In the first (full) format this processing involves expanding the set of m input features to a higher dimension and then processing the features in the higher dimension, including performing the fully connected layer in the higher dimension. In the reduced format, however, the fully connected layer is performed in the lower dimension, such that the fully connected layer takes a set of m input features and processes these to a set of m' output features (directly, without any intermediate expansion to a higher dimension). This smaller fully connected layer can therefore be executed more efficiently at execution time.

Thus, in embodiments, the neural network includes a 'reducible' output block that in the first format includes a sequence of operations comprising expanding a set of m input features to a higher dimension and then performing a fully connected layer operation in the higher dimension to provide a set of m' output features, which reducible output block is replaced with a reduced format output block which comprises a fully connected layer operation that processes a set of m input features to a set of m' output features in the execution version of the neural network.

The output block (in both formats) in an embodiment also comprises a non-linear activation function, e.g., and in an embodiment, a ReLU, that is applied at the input to the block, i.e. before the expansion in the first (full) format and before the fully connected layer in the second (reduced) format.

Accordingly, in addition to including one or more, and in an embodiment a plurality, of the 'reducible' inverted bottleneck blocks of the technology described herein, the neural network of the technology described herein in an embodiment also includes a 'reducible' output block.

It is contemplated that various other types of 'reducible' blocks could also be used, as desired, e.g. depending on the structure of the neural network.

The neural network may also contain other types of non-reducible blocks, e.g. depending on the structure of the neural network. For example, the first processing block in MobileNetV2 comprises a full convolution layer. This may also be provided in the neural network of the technology described herein. In some embodiments, the initial full convolution layer may also be replaced with a reducible inverted bottleneck block. This will result in the same size and structure as the full convolution layer but may improve accuracy performance. Other arrangements would of course be possible.

Compared to MobileNetV2, by using the new types of blocks that can be reduced in the manner of the technology described herein, it is therefore possible to provide a more hardware-friendly model (that can be executed more efficiently by a dedicated hardware accelerator, e.g. NPU) whilst still achieving higher accuracy, and without increasing the size of the neural network.

Thus, once the model is trained in its 'full' format, the model is then provided for output (for execution) in a reduced format, and subsequently the reduced format version of the model is used (executed) to perform a neural network processing task.

Thus, in embodiments, after providing the model for output, the method further comprises executing the model including the reduced format version of the trained neural network to perform a neural network processing task.

Subject to the particular requirements of the technology described herein, the neural network of the technology described herein may be used for any suitable neural network processing, as desired. For instance the model that is generated based on the neural network may be configured (trained) to perform any suitable neural network processing task. In embodiments the neural network processing may comprise an inference or classification task.

The model may thus be used to process any suitable input features (which may, e.g., comprise an input image, audio file, or any other suitable set of data) into a desired output (which may be an output result, e.g. an inference or classification result).

Correspondingly, the neural network may be trained using any suitable set of training data, e.g. based on the neural network processing task in question. The training itself can be performed as desired, e.g. in a known fashion. In an embodiment this is performed in a supervised manner using appropriate training data including appropriate input/output features depending on the inference or classification task in question.

The training is typically (in an embodiment) performed in advance, and "offline", and can be performed on any suitable processor.

It will be appreciated that the execution of the model may therefore generally, and typically, take place sometime after the initial model generation, and typically at a different place (on a different processor). For example, the model will normally (and in an embodiment) be generated offline and then provided to a data processing system for use as and when desired. A host processor (e.g. CPU) of the data processing system when executing an application that requires neural network processing can then trigger the desired neural network processing of the model.

In an embodiment this is done by offloading at least some of the neural network processing to a dedicated hardware accelerator (e.g. NPU), as will be explained further below, and the neural network is in an embodiment optimised for execution by the hardware accelerator (e.g. NPU).

This therefore represents a significant improvement in that the neural network can be efficiently processed using a hardware accelerator (NPU), with the associated benefits of doing that. Thus, the overall efficiency can be improved, both by using the hardware accelerator (NPU) in the first place, and by optimising the neural network for execution by the hardware accelerator (NPU).

However, it will be appreciated that the neural networks of the technology described herein are not limited to execution on dedicated hardware accelerators (e.g. NPUs) and the neural network processing can generally be executed on any suitable processing circuit or hardware, such as a graphics processor (graphics processing unit, GPU), central processor (central processing unit, CPU), or some combination thereof. In that case, technology described herein can still provide benefits in allowing more optimised execution based on the available hardware by allowing blocks to be collapsed into a more execution-friendly format.

The neural networks of the technology described herein therefore provide various benefits compared to existing neural network architectures.

In particular, as explained above, an aspect of this is the construction of new types of blocks, e.g. the new types of 'reducible' inverted bottleneck blocks, and a 'reducible' output block, that facilitate this transformation.

The neural network of the technology described herein thus contains at least some of these types of reducible blocks. The neural network may generally comprise any suitable number and arrangement of these blocks. The neural network may also comprise any other suitable and desired processing blocks, which may either be reducible or not, depending on their purpose.

For example, in embodiments, the overall structure and arrangement of the blocks is similar to MobileNetV2, e.g. including a sequence of inverted bottleneck blocks, but with at least some of the traditional MobileNetV2 IBN blocks replaced with the inverted bottleneck blocks of the technology described herein, and with the output layers replaced with the reducible output block of the technology described herein. Other arrangements would however of course be possible.

In some embodiments the neural network may also contain at least some traditional IBN blocks (that are not reduced or replaced in the manner described above).

That is, there may generally be a mixture of different types of blocks within the neural network, including both reducible inverted bottleneck blocks and traditional IBN blocks. Likewise, in some embodiments, some of the 'reducible' blocks may be retained in the first (full) format for execution. That is, in some cases, a 'reducible' block may not be replaced with its reduced format version (even where it would be possible to do so).

Thus, the version of the model that is executed may contain a mixture of different types of blocks. The selection of which blocks to use at which positions within the neural network may be determined as desired, e.g. based on the desired performance level.

For instance, there may be some layers within a neural network where it is more critical to achieve the higher performance that may be possible using traditional IBN blocks (or, similarly, using reducible blocks in the first (full) format that are retained in the first format for execution), such that the reduced execution efficiency may be tolerated. However, other blocks in the neural network may be less critical for accuracy, such that these blocks can (and in an embodiment are) replaced with the new reducible inverted bottleneck blocks of the technology described herein to increase execution efficiency without significant loss of accuracy.

For instance, it has been found that it may be more important for the initial layers in the neural network to provide higher accuracies, in which case the initial layers may include inverted bottleneck blocks that are in a full format (i.e. reducible blocks in the first (full) format, or traditional IBN blocks). On the other hand, it may be possible to utilise 'reducible' inverted bottleneck blocks in the other layers of the neural network when training the network, which are then replaced at execution time, without reducing the model performance. Various arrangements would of course be possible in this regard.

There are various ways to determine which blocks should be used at which positions. For instance, this could be done manually, or by a process of trial-and-error. It is also known to employ neural architecture search (NAS) algorithms when generating a neural network in order to optimise the neural network structure. A problem with existing NAS algorithms is that they are not generally designed to optimise neural networks for specific hardware execution. For instance, traditional IBN blocks can already be efficiently executed using general purpose processors. The present Applicants have however recognised that there may be a problem when executing these traditional IBN blocks using dedicated hardware accelerators (e.g. NPUs).

More generally, the present Applicants recognise that it may be the case that the optimal selection of which types of blocks to use may depend on the available processing resource, as well as the desired accuracy performance. Thus, in embodiments, the training process may further comprise determining which blocks can (and therefore should) be replaced with corresponding reduced format blocks for execution, and which blocks should not be replaced in this way. For example, it may be the case that certain blocks are more critical to accuracy performance than others, and for those blocks it may therefore be more appropriate to use traditional IBN blocks, wherein the non-linearity is included within the inverted bottleneck convolution operations. On the other hand, there may be other blocks where linearity is acceptable (i.e. does not significantly reduce accuracy), and which blocks can therefore be replaced with reducible inverted bottleneck blocks of the technology described herein to facilitate execution on the available processing resource.

The Applicants have therefore also developed an efficient (e.g. lightweight, quick) NAS algorithm that is able to determine, for example, whether a given inverted bottleneck block within a neural network should comprise a traditional IBN block or a reducible inverted bottleneck block of the technology described herein. The NAS algorithm is in an embodiment based on a neural network model including a number of "NAS bottleneck" blocks, as will be explained below. The NAS bottleneck blocks are parametrised in such a way that the NAS algorithm can determine whether it is optimal for a given NAS bottleneck block, at a given position within the neural network, to be a traditional IBN block (with non-linearity applied within the inverted bottleneck) or a reducible inverted bottleneck block of the technology described herein (with the non-linearity applied outside of the inverted bottleneck). The NAS bottleneck block thus in an embodiment has a similar structure as a traditional IBN block in MobileNetV2 except that the ReLU activation functions within the inverted bottleneck are replaced with parametric ReLU functions (PReLUs). The PRELU function is an activation function that generalised the traditional ReLU function with a slope for negative values.

For example, as explained above, the ReLU activation function is a piecewise function that will output the input directly if it is positive, otherwise, it will output zero (i.e. $f(y)=y$ if $y\geq0$; $f(y)=0$ if $y<0$. The PRELU function generalizes this such that it will output the input directly if it is positive, but if the input (y) is negative, it will output a scaled version of the input, with scaling factor 'a' (i.e. $f(y)=y$ if $y\geq0$; $f(y)=a.y$ if $y<0$). The idea with such PRELU functions is thus that different layers may require different types of non-linearity, and the slope parameter 'a' can be used to parametrize this.

Thus, a NAS bottleneck block in an embodiment comprises the following sequence of operations: a first PRELU activation function, a 1×1 convolution (expansion) operation, a second PRELU activation function, a 3×3 depthwise separable convolution, a third PRELU activation function, and a 1×1 convolution (reduction) operation. In an embodiment each PReLU activation function is also associated with a batch-normalisation function that is applied at the same time as the PRELU function.

The present Applicants however have realised that by replacing the ReLU functions within the IBN block with such PRELU functions, and then training the version of the neural network including these NAS bottleneck blocks accordingly, the training will automatically determine the optimal values for the scaling factor 'a' and this can be used to select between the different types of blocks.

In particular, in the NAS algorithm of the technology described herein, the PRELU scaling factor 'a' is constrained to be only '0' or '1'. Also, the scaling factors for the two PRELU activation functions within the inverted bottleneck block (i.e. after the expansion and after the depthwise separable convolution) are constrained to always have the same value.

The neural network including the NAS bottleneck blocks can then be trained appropriately in order to determine which types of blocks should be included at which positions.

The NAS algorithm can thus be executed over the neural network including the NAS bottleneck blocks to determine the optimal values for the scaling factor for each of the NAS bottleneck blocks. In this way, the algorithm can automatically select between traditional IBN blocks and the reducible inverted bottleneck blocks of the technology described herein.

For instance, it will be appreciated that when the scaling factor a=0 this means that the PRELU is identical to a traditional ReLU activation function. This means that it is optimal to have non-linearity inside the inverted bottleneck block, and that a traditional IBN block should therefore optimally be used.

On the other hand, when the scaling factor a=1, the activation function is strictly linear across the full input range. Accordingly, this means that it is tolerable to introduce linearity into the inverted bottleneck block, which means that the reducible inverted bottleneck blocks of the technology described herein can be used.

The use of these NAS bottleneck blocks thus provides an effective, 'one-shot' algorithm that is able to automatically select between these different types of blocks as part of the training process. For any blocks for which it is determined that the reducible inverted bottleneck blocks of the technology described herein can be used, these can then be replaced accordingly with corresponding second (reduced) format blocks for execution.

This block structure selection is in an embodiment performed as part of the generation of the executable model. For example, in an embodiment a candidate neural network model is generated, including a certain number and arrangement of inverted bottleneck blocks. As part of an initial training process, a step of NAS block structure selection is then performed using a version of the neural network including the NAS bottleneck blocks in order to determine which of the inverted bottleneck blocks should comprise traditional IBN blocks and which of the inverted bottleneck blocks should comprise reducible inverted bottleneck blocks of the technology described herein.

Thus, in some embodiments, after the NAS block structure selection is performed to determine which blocks should comprise which type of inverted bottleneck block, the version of the neural network generated by the NAS block structure selection, i.e. including the determined arrangement of traditional IBN blocks and reducible inverted bottleneck blocks of the technology described herein is then subject to a further training (e.g. fine-tuning) process to determine the neural network parameters (weights) for that version of the neural network, with at least some of the reducible inverted bottleneck blocks in that version of the neural network then being replaced with reduced format blocks for execution.

In that case, the initial NAS training may simply determine which blocks should contain non-linearity and which blocks can be linear and then any suitable non-linear/linear blocks can be set at those positions to define a first version of the neural network for (further) training.

In other embodiments, however, a single training process is performed that also includes the NAS block structure selection process. In that case, the version of the neural network including the NAS bottleneck blocks may be the first version of the neural network that is trained as described above. That is, the version of the neural network including the NAS bottleneck blocks may be trained, and after this training, the NAS bottleneck blocks will be replaced appropriately either with traditional IBN blocks, or with the reducible inverted bottleneck blocks of the technology described herein (which in turn are then replaced with reduced format versions of the blocks for execution). That is, the block type selection may be incorporated into a single training step that automatically determines which types of blocks should be included at which positions, and also determines the neural network parameters (weights) the blocks should have.

When the training process also includes the NAS block structure selection process, the version of the neural network that is used for training thus includes at each position in the neural network where an inverted bottleneck block is to be placed, a new type of "NAS bottleneck block". Thus, the first format version of a block may be a NAS bottleneck block, and as a result of the training process, at least some of the NAS bottleneck blocks in the first format may be replaced (for execution) with corresponding reduced format blocks where the NAS training determines it is appropriate to do so. (Conversely, traditional IBN blocks are in an embodiment then used for the remaining blocks that the NAS training determines should not be reduced in this way).

Thus, in embodiments, the neural network in the first format comprises one or more inverted bottleneck blocks that comprise a set of parametrised activation functions (e.g. parametrised rectified linear unit (PRELU) activation functions), wherein training the first version of the neural network including the blocks in the first format comprises determining the (optimal) parameters for the parametrised activation functions. The (optimal) parameters for the parametrised activation function may indicate whether or not the block can be replaced with a corresponding block in the second (reduced) format for execution. The training process then determines which blocks can be replaced in this way. The method may thus further comprise determining which blocks in the first format to replace based on the determined optimal parameters for the parametrised activation functions. The training process to determine the optimal parameters for the parametrised activation functions in an embodiment also takes into account the hardware that the model is designed to be executed by.

In an embodiment, the parametrised activation functions comprise rectified linear unit (PReLU) activation functions, with a parameter that is in an embodiment constrained to a first value indicating that the block can be replaced with a corresponding second format version of the block for execution and a second value indicating that the block should not be replaced for execution. For example, the first value may indicate that linearity is acceptable (e.g. the PRELU parameter is '1' such that the function is linear) and that a reducible inverted bottleneck of the technology described herein can therefore be used for that block. The second value may conversely indicate that some non-linearity is desired in that block (e.g. the PRELU parameter is '0' such that the PReLU becomes a ReLU function) and that, e.g., a traditional IBN block should be used at that position.

However, other arrangements would be possible. For example, the parametrised rectified linear unit (PReLU) activation functions may be constrained to a single value indicating one type of block, and if the training does not converge, this may be taken to mean to that the other type of block should be used. Likewise, other parametrised activation functions may be used to similar effect, with appropriate design of the NAS blocks, to determine where linearity may or may not be desired (e.g. where linearity may be acceptable whilst still achieving a desired performance accuracy).

In either case, once the training has been completed, the trained neural network including the selected blocks can then be provided for output (for execution) accordingly, with some of the blocks being replaced with corresponding second (reduced) format blocks, as appropriate, as described above.

Various other arrangements would be of course be possible for determining the underlying neural network structure.

The above description primarily explains the generation of an executable model according to the technology described herein, in particular by the two-stage process of training a neural network in a first (full) format, and then replacing some of the neural network processing blocks with corresponding blocks in a second (reduced) format for execution.

As explained above, the result of this two-stage process is to generate improved executable models. For example, an executable model according to the technology described herein may be characterised by a particular order of (regular) convolution operations that in an embodiment facilitate hardware (NPU) execution, and a relatively higher accuracy for its size (e.g., compared to other neural networks based on similar (regular) convolution operations such as ResNetV2).

The technology described herein thus also extends to executable models that have been generated in this way, and that include the novel neural network processing blocks of the technology described herein.

A second main embodiment of the technology described herein thus comprises an executable model that can be executed by a processor to perform a neural network processing task, wherein the model comprises:

a neural network including a plurality of layers that are together arranged to process an input to the neural network to generate a respective output, wherein the neural network comprises a number of blocks, each block comprising one or more layers of the neural network, and each block configured to perform a respective sequence of processing operations, wherein the neural network includes one or more convolution blocks, each convolution block comprising at least one non-linear activation function and a set of one or more convolution operations, wherein the at least one non-linear activation function is applied separately to the set of one or more convolution operations; and a set of neural network parameters to be applied for the neural network processing layers.

It will be understood that the model that is executed according to these further embodiments may be generated using any or all of the features described above in relation to the previous embodiments, at least to the extent they are not mutually exclusive.

Thus, the convolution blocks correspond to the inverted bottleneck blocks of the technology described herein in the second (reduced) format. Accordingly, the set of one or more convolution operations within a convolution block in an embodiment comprises a set of convolution operations of a type that a hardware accelerator (e.g. NPU) is configured to more efficiently perform. This may be, e.g., and in an embodiment is, a set of "regular", e.g. regular 3×3, convolution operations.

Further, the set of one or more convolution operations in an embodiment replicate the result of a respective sequence of inverted bottleneck convolution operations. By applying the non-linear activation function separately to the set of one or more convolution operations, it is thus possible to transform from the reduced format to the full format (and vice versa), as explained above.

As described above, the non-linear activation function in an embodiment comprises a ReLU activation function. In an embodiment a ReLU activation function is applied before each convolution operation in the convolution block.

Other activation functions may also be applied as desired. For example, in embodiments, one or more batch-normalisation activation functions may also be applied. These can be applied at any position since they are linear and do not affect the transformation between the first (full) and second (reduced) formats.

The convolution blocks may comprise non-residual blocks. At least some of the convolution blocks may however comprise residual blocks. As mentioned above, in the case of a residual block, the convolution block in an embodiment comprises a set of two regular (e.g. regular 3×3) convolutions, in an embodiment with a first non-linear activation function (e.g. ReLU) applied before the first convolution and a second non-linear activation function (e.g. ReLU) applied between the sets of convolutions.

The neural network in an embodiment also comprises an output block that comprises a fully connected layer operation that processes a set of m input features to a set of m' output features in the execution version of the neural network (directly, without any intermediate expansion to a higher dimension). The output block in an embodiment also comprises a non-linear activation function, e.g., and in an embodiment, a ReLU, that is applied before the fully connected layer. The output block thus corresponds to the reducible output block described above in its reduced format.

The neural network in an embodiment also comprises, at its input, an initial full convolution processing layer.

In an embodiment the neural network structure is arranged similarly to the MobileNetV2 model (except with some of the traditional IBN blocks in the MobileNetV2 model being replaced with the (reduced format) convolution blocks according to the technology described herein, and the final layers replaced with the (reduced) output block).

Thus, in embodiments, the neural network comprises an initial full convolution processing layer, followed by a sequence of (reduced format) convolution blocks, and then a final (reduced) output block. As mentioned above, in embodiments, the neural network may comprise a mixture of (reduced format) convolution blocks and traditional IBN blocks. For example, it has been found that it may be beneficial for the initial blocks to comprise traditional IBN blocks, as these blocks may be more critical for achieving higher accuracies. Thus, in embodiments, the neural network may comprise an initial full convolution processing layer, followed by a first sequence of one or more inverted bottleneck blocks, a second sequence of one or more (reduced format) convolution blocks, and then a final (reduced) output block.

Various other arrangements of blocks would of course be possible. For example, in some embodiments, the initial layer may also comprise a reducible block that can be replaced for execution in a similar manner described above.

Once an executable model has been generated in this way, the model can then be executed, as desired, e.g. when it is desired to perform a neural network processing task.

The model can be executed by any suitable processing circuitry, as desired. For example, in some embodiments, the model may be executed at least in part by a graphics processor (graphics processing unit, GPU). In some embodiments, the model may at least in part be executed by a main (e.g. host) processor of a data processing system, e.g. a central processor (central processing unit, CPU). The neural network may also be executed by a combination of different processors. In this respect, it will be appreciated that using reduced format blocks for execution generally provide improvements regardless of the specific processing circuitry that is used for the execution, e.g. by reducing number of processing operations, etc., to facilitate execution.

Further, the technology described herein allows the neural network model to be designed appropriately for optimal execution using the available processing circuitry, whatever that is. For example, it will be appreciated that any particular processing element may be configured to perform some processing operations more efficiently, and the technology described herein generally allows blocks in a first format to be replaced with corresponding blocks in a second (reduced) format to facilitate improved execution, but the optimal form of the blocks in the second format may be different depending on the processing element that it is desired to optimise the neural network execution for.

For example, in some embodiments, the step of executing the model to perform a neural network processing task is performed at least in part using a hardware accelerator (e.g. NPU), and the reduced format blocks are accordingly in an embodiment optimised for execution by the hardware accelerator (e.g. NPU).

The neural network processing hardware accelerator (NPU) is generally configured to perform (at least some types of) neural network processing (execution) in an optimised manner. In an embodiments, the hardware accelerator (NPU) comprises a plurality of MAC processing circuits that are configured to perform MAC processing operations. The hardware accelerator (NPU) may be, e.g., and in an embodiment is, configured such that MAC processing circuit is optimised when performing regular (e.g. regular 3×3) convolutions.

However, other arrangements would be possible and the hardware accelerator (NPU) (MAC processing circuits) may in principle be configured to optimally perform any suitable and desired processing operations. In that case, the reduced format blocks in the technology described herein may be suitably designed to include processing operations of whatever type the specific hardware accelerator (NPU) that the model is designed to be executed by is configured to more efficiently perform.

The neural network processing hardware accelerator (NPU) should, and in an embodiment does, include appropriate processing circuits, logic, etc., suitable for performing neural network processing operations. Thus the hardware accelerator (NPU) in an embodiment comprises, inter alia, processing circuit(s) configured to apply a filter to an input data array and in an embodiment to perform a weighted sum using input data and weight data. In an embodiment, the hardware accelerator (NPU) comprises appropriate circuit(s) for performing the weighted sum. In an embodiment, the hardware accelerator (NPU) is configured to perform a weighted sum as a multiply-accumulate operation, and accordingly the processor comprises one or more multiply-accumulate circuits (otherwise known as a multiplier-accumulator, or an "MAC unit") for performing a multiply-accumulate operation.

In an embodiment, the hardware accelerator (NPU) comprises a plurality of multiply-accumulate circuits (MAC units), in an embodiment arranged in parallel.

In an embodiment, the neural network processing hardware accelerator (NPU) (the relevant processing circuits, e.g. MAC unit(s) of the processor) is configured (constructed) particularly to perform particular, in an embodiment selected, in an embodiment predetermined, neural network processing operations in an efficient manner, and most in an embodiment configured for applying a filter to an input data array in a particular, in an embodiment selected, in an embodiment predetermined manner.

In an embodiment, the (processing circuits of the) neural network processing hardware accelerator (NPU) is configured to (optimised to most efficiently) apply a filter to an input data array according to a particular, in an embodiment selected, in an embodiment predetermined, stride (corresponding to a number of data positions in the x and y directions respectively between sets of data positions of the input data array to which the filter is applied). The processor may be particularly configured to use any suitable stride, but in particularly embodiments is configured to use a 1×1 stride.

The neural network processing hardware accelerator (NPU) may otherwise be configured as desired and may, e.g., have any of the usual or desired features for the hardware accelerator (NPU).

As mentioned above, the executable models of the technology described herein are in some embodiments designed to be (and are ultimately) executed on such hardware accelerators (e.g. NPUs). The model may thus in some embodiments be designed to be efficiently executed by such hardware accelerators (NPUs).

The technology described herein thus also extends to the execution by a hardware accelerator (e.g. NPU) of a model that is generated in the manner described above.

A third main embodiment of the technology described herein thus comprises a method of executing a model to perform a neural network processing task using a hardware accelerator that comprises a plurality of multiply-accumulate circuits (MAC units), the model comprising:

a neural network including a plurality of layers that are together arranged to process an input to the neural network to generate a respective output, wherein the neural network comprises a number of blocks, each block comprising one or more layers of the neural network, and each block configured to perform a respective sequence of processing operations, wherein the neural network includes one or more convolution blocks, each convolution block comprising at least one non-linear activation function and a set of one or more convolution operations of a type that the hardware accelerator's multiply-accumulate circuits are configured to (optimally, e.g. more efficiently) perform, wherein the at least one non-linear activation function is applied separately to the set of one or more convolution operations;

the method comprising:

executing the model including the neural network to perform the neural network processing task;

wherein executing the model including the neural network to perform the neural network processing task comprises executing at least the sets of convolution operations within the convolution blocks of the type that the hardware accelerator's multiply-accumulate circuits are configured to (optimally, e.g. more efficiently) perform using the multiply-accumulate circuits of the hardware accelerator.

The technology described herein according to this embodiment may have any optional features described above, at least to the extent they are not mutually exclusive.

Thus, the model may have any and all of the optional features of the model described in relation to the second embodiment. Further, the model is in an embodiment generated according to the method of the first embodiment of the technology described herein.

The neural network processing hardware accelerator (NPU) may be operated under control of a host processor (CPU) to perform neural network processing as and when required by an application executing on the host processor. Thus, the host processor may issue commands to the neural network processing hardware accelerator (NPU) to cause the neural network processing hardware accelerator (NPU) to perform neural network processing. The neural network processing hardware accelerator (NPU) may then perform the neural network processing accordingly using its version of the neural network (model).

That is, the neural network processing hardware accelerator (NPU) may be provided as part of an overall data processing system.

The data processing system may be implemented as part of any suitable electronic device which may be required to perform neural network processing, e.g., such as a desktop computer, a portable electronic device (e.g. a tablet or mobile phone), or other electronic device. Thus the technology described herein also extends to an electronic device that includes the data processing system of the technology described herein (and on which the data processing system operates in the manner of the technology described herein). The data processing system of the present may, in an embodiment, be implemented as part of a portable electronic device (such as a mobile phone, tablet, or other portable device).

The data processing system may comprise any desired components and elements that a data processing system can comprise, such as one or more or all of: a display processing unit (display processor), a central processing unit (CPU), a graphics processing unit (GPU) (graphics processor), a video processor, a digital signal processor, one or more neural network processors, a display and a memory.

The processors may be arranged within a system-on-chip system.

The memory of the data processing system may comprise memory for storing data, inter alia, relating to neural network processing. For example, the memory may store data for input data arrays, output data arrays, and weight data arrays. The memory may comprise one or more local memories, which may be located on-chip. The local memory may comprise one or more caches.

The memory may also comprise a main memory, which may be an external memory which may be located off-chip. The main (external) memory may be any suitable type of memory, such as SDRAM for example.

The data processing system (and in particular the processors of the data processing system) may be operable to access data which is present in a local memory (cache) when performing neural network processing. The data processing system may be operable to request data to be transferred from main (external) memory to local memory if data that is required is not already present in the local memory. The data processing system may comprise one or more circuits for transferring data from main memory to local memory (and for transferring data from local memory to main memory), e.g. such as one or more a direct memory access (DMA) units which may be associated with the processor which is to perform the neural network processing.

The technology described herein may be used in conjunction with any suitable and desired neural network. In embodiments, the neural network is a convolutional neural network.

The neural network processing which is to be performed may comprise any suitable operation which modifies an input data array to generate a corresponding output data array.

The neural network processing which is to be performed may be part of (or may comprise) a layer of neural network processing. The layer of neural network processing may be one of plural layers of neural network processing which are performed in sequence. The layer of neural network processing in question may comprise a first layer in a sequence of plural layers. Alternatively, the layer of neural network processing in question may comprise a layer which is not the first layer (is an intermediate layer) in a sequence of plural layers. Each layer of neural network processing may process an input data array (input feature map) to generate an output data array (output feature map), wherein when plural layers of neural network processing are to be performed in sequence, one after the other, the output data array generated by a layer is used at least in part as an input data array for a next layer in the sequence.

The neural network processing which is to be performed may be part of (or may comprise) a layer of neural network processing which is a convolution layer, a deconvolution layer or a pooling layer of a neural network.

The input data array which is to be processed according to the neural network processing may be any suitable array of input data (input feature map). The input data array may comprise an array of (plural) data positions, each data position having one or more data values associated therewith.

The input data array which is processed may comprise an entire input data array which is stored in memory and which is to be processed according to a layer of neural network processing, for example an entire input feature map. Alternatively, the input data array which is being processed may comprise (only) part of an overall input data array (e.g. which is stored in memory), e.g. where an overall input data array is processed as a plurality of portions (tiles) making up the overall input data array. In this case, each portion (tile)

of the input feature map is in an embodiment respectively processed in the manner of the technology described herein.

Hence, the input data array which is processed may comprise a region of a larger input data array (the larger input data array corresponding to for example an entire input feature map to be processed by a layer of neural network processing), wherein said larger input data array may be divided into any suitable number of regions (tiles) for processing by the processor.

The neural network processing may perform processing for each input data array corresponding to a region of a larger input data array, e.g. in turn, thereby operating a tile-based processing scheme (in which each tile corresponds to a region of the larger input data array).

Accordingly, the input data array which is processed may comprise (at least part of) an input feature map for a layer of neural network processing.

The output data array (which is generated by the neural network processing from the input data array) may correspondingly comprise (at least part of) an output feature map for the layer of neural network processing. The output data array may comprise an array of data positions, each data position having one or more data values associated therewith. The output data array may be written to memory, or may be provided directly to a processor for use as an input data array, for example when processing a subsequent layer of neural network processing.

The input feature map may correspond to (or be derived from) any suitable data which is received by the data processing system for processing according to neural network processing in order to generate a useful output such as, for example, an image, an image from an Image Signal Processor (ISP), an image frame from video data, sound data or voice data, or other input data. Correspondingly the neural network processing which is to be performed by the processor may contribute to identifying or classifying features present within the data (initially) received by the data processing system, e.g. such as objects in an input image, or sound features in input sound data. Alternatively, the neural network processing which is to be performed by the processor may contribute to training the neural network.

The data processing system may comprise and/or be in communication with one or more memories (such as the memories described above) that store the data described herein, and/or store software for performing the processes described herein. The data processing system may comprise and/or be in communication with a host microprocessor, and/or with a display for displaying output data associated with the neural network processing.

The data processing system of the technology described herein may be implemented as part of any suitable system, such as a suitably configured micro-processor based system. In some embodiments, the technology described herein is implemented in a computer and/or micro-processor based system.

The various functions of the technology described herein may be carried out in any desired and suitable manner. For example, the functions of the technology described herein may be implemented in hardware or software, as desired. Thus, for example, the various functional elements of the technology described herein may comprise a suitable processor or processors, controller or controllers, functional units, circuits, processing logic, microprocessor arrangements, etc., that are operable to perform the various functions, etc., such as appropriately dedicated hardware elements (processing circuits) and/or programmable hardware elements (processing circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing circuits may share processing circuits, etc., if desired.

It will also be appreciated by those skilled in the art that all of the described embodiments of the technology described herein may include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on data processor, a computer program element comprising computer software code portions for performing the methods herein described when the program element is run on data processor, and a computer program comprising code adapted to perform all the steps of a method or of the methods herein described when the program is run on a data processing system.

The technology described herein also extends to a computer software carrier comprising such software which when used to operate a data processing system causes in a processor, or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described by way of example only and with reference to the accompanying drawings, in which:

Like reference numerals are used for like features in the drawings (where appropriate).

Figure 3:
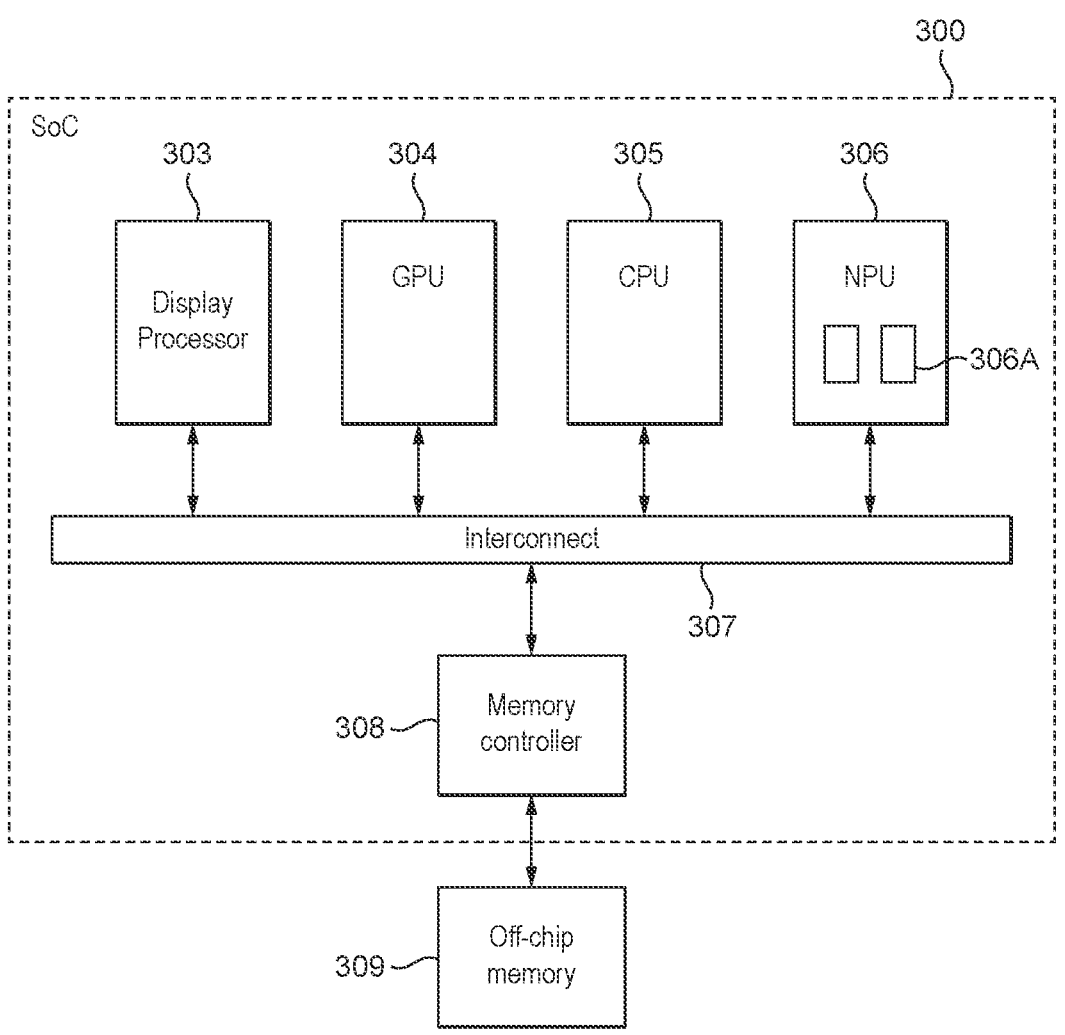
FIG. 3 shows schematically an exemplary data processing system within which embodiments of the technology described herein may be implemented.

FIG. 3 shows an exemplary system on-chip (SoC) data processing system 300 within which the technology described herein can be employed. As shown in FIG. 3, the data processing system 300 in the present embodiment comprises a host processor in the form of a central processing unit (CPU) 305, a graphics processor (GPU) 304, a display processor 303, a neural processing unit (NPU) 306 and a memory controller 308. As shown in FIG. 3, these units communicate via an interconnect 307 and have access to off-chip memory 309.

In this system, the graphics processor 304 will, for example, render frames (images) to be displayed, and the display processor 303 will then provide the frames for output, e.g. to a display panel for display.

Correspondingly, the neural processing unit (NPU) 306 will perform neural network processing. The neural processing unit (NPU) 306 comprises circuits (hardware) (e.g. such as multiply-accumulate circuits 110) which are specifically configured to most efficiently perform neural network processing in a particular predetermined manner. The neural processing unit (NPU) 306 is thus designed to perform certain types of neural network processing operations in an optimised manner.

The data processing system 300 may of course include any other components or processing units that may be desired. For instance, the data processing system 300 may further comprise an image signal processor (ISP), a video decoder, an audio codec, etc., or any other components that a data processing system 300 may desirably have. A sensor may provide input data for the system 300 (e.g. video data and/or sound data from a suitable camera or microphone or other sensor device).

The present embodiments relate particularly to the processing of neural networks, and in particular to neural network-based models that are executed using a dedicated hardware accelerator, e.g. the neural processing unit (NPU) 306 shown in FIG. 3. In particular, the present embodiments present an improved neural network structure that can be used to generate models that can be more efficiently executed by neural processing unit (NPU) 306.

Figure 4:
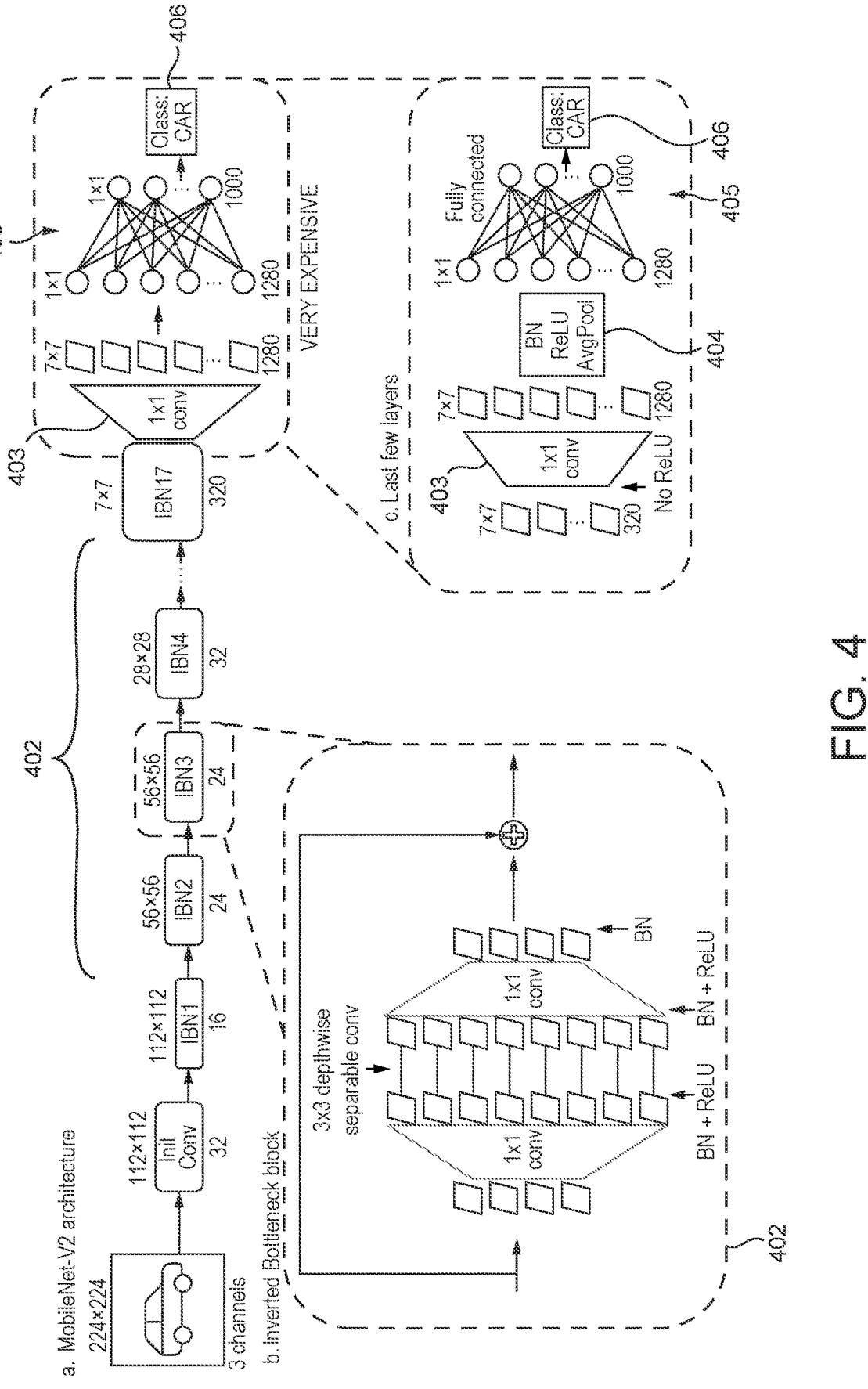
FIG. 4 shows schematically an example of a convolutional neural network according to the MobileNetV2 architecture.

For instance, the present embodiments relate to a neural network that shares similarities with the known Mobile-NetV2 architecture illustrated in FIG. 4, and described above. The MobileNetV2 structure has been successfully employed in a large number of computer vision applications (e.g., object detection, semantic segmentation, etc.).

The main building blocks in the MobileNetV2 model are Inverted Bottleneck (IBN) blocks 402 which (i) expand input features to a very high-dimensional space using a 1×1 convolution, (ii) perform a 3×3 depthwise separable convolution (DSConv) in the high-dimensional space, and (iii) then project these intermediate features back into low-dimensional space using another 1×1 convolution. This is illustrated in FIG. 4.

Since both 1×1 convolutions and 3×3 DSConvs require relatively few Multiply-Accumulate (MAC) operations and only a small number of parameters, MobileNetV2 is a highly compact convolutional neural network that has resulted in state-of-the-art accuracies. Due to its computational efficiency, MobileNetV2 is often run on mobile-CPUs.

However, the present Applicants have found that there can be inefficiencies when attempting to execute MobileNetV2 on constrained hardware such as a neural processing unit (NPU). Specifically, MAC utilization of DSConvs on typical NPUs is significantly lower than that for regular 3×3 convolutions. Hence, if a model has a regular 3×3 convolution with similar MACs and number of parameters as an IBN block, the regular 3×3 convolution will run significantly faster than the IBN block due to high utilization on NPUs.

On the other hand, achieving high accuracy with models that include regular 3×3 convolutions is difficult and often results in a very large model size and high numbers of MACs.

The present embodiments thus provide a new neural network architecture that uses regular 3×3 convolutions where possible at execution time, to facilitate a more efficient execution, but wherein the neural network can still be trained to achieve higher accuracies, comparable to those achieved using MobileNetV2 networks, without significantly increasing the model size and number of MAC operations.

To achieve this, the present embodiments propose a new approach which trains a first, 'full' version of a neural network, but which neural network can be analytically collapsed into a very efficient inference model utilising small, regular 3×3 convolutions. As a result, the inference-time model is very suitable for hardware accelerators like NPUs. However, by training a larger network, which is then collapsed into a more efficient network, the present Applicants have found it is also possible to retain higher accuracies.

Specifically, the present embodiment proposes to replace a number of blocks within the MobileNetV2 model shown in FIG. 4, which have been found to represent performance pinch points when executed by an NPU, with new types of 'reducible' blocks that can be trained using a fuller format version of the block, which is then reduced into a more hardware efficient format for execution. There are number of aspects to this, as explained below.

Inverted Bottleneck Blocks

Figure 5:
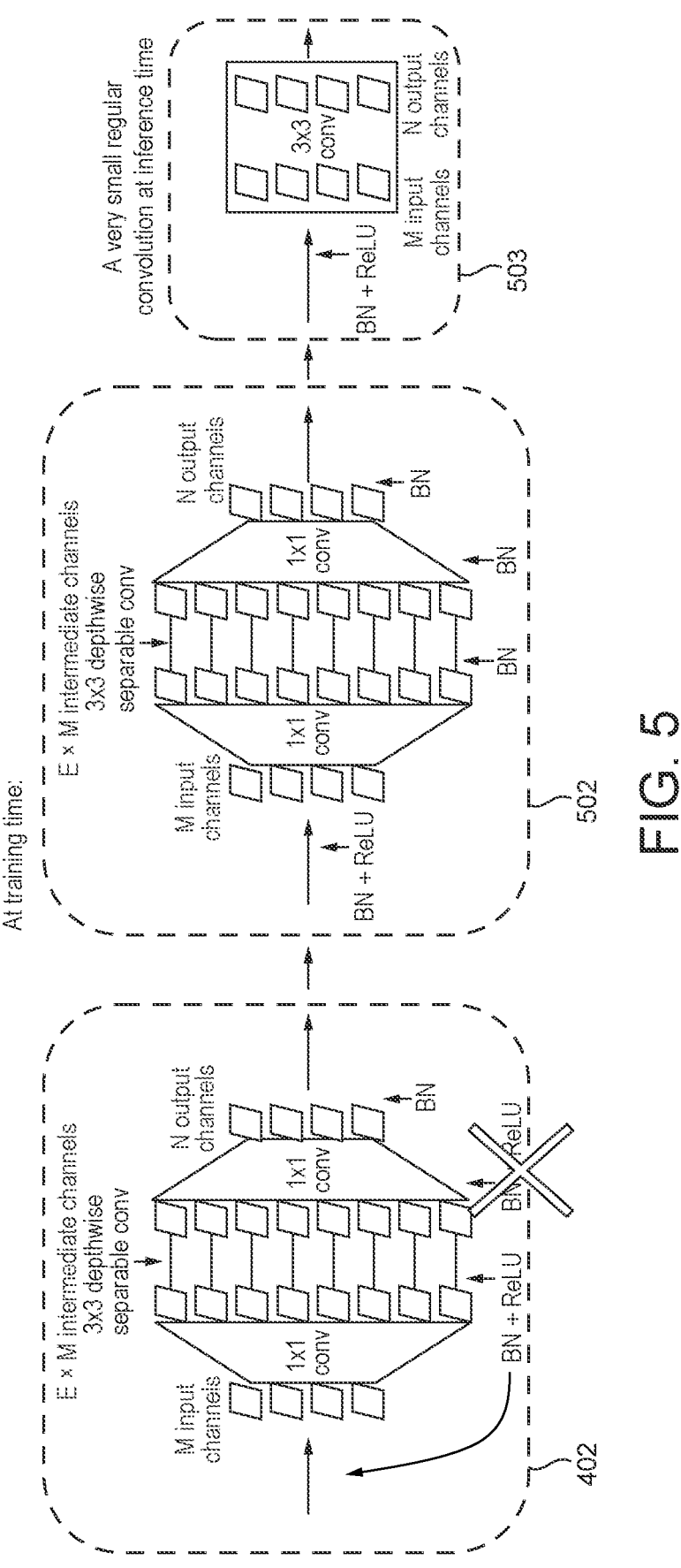
FIG. 5 shows an example of a block that may be used within a neural network according to an embodiment.

Firstly, the present Applicants have recognised that the execution of the IBN blocks 402 in MobileNetV2 often does not fully utilise hardware resource, e.g. in a typical NPU, and attempting to execute these blocks using a typical NPU can therefore be inefficient. According to the present embodiment, most of the IBN blocks in the MobileNetV2 model are accordingly replaced by new types 'reducible' inverted bottleneck blocks ("RIBNs"), as shown in FIG. 5 (without residuals) and FIG. 6 (with residuals).

The 'reducible' inverted bottleneck blocks in their full format train multiple linear convolution layers that can be analytically collapsed into small, regular 3×3 convolutions at inference time. The aim is to replace IBN blocks with RIBN blocks without losing significant accuracy, as well as without prohibitively increasing model size and MACs (since large 3×3 convolution layers can increase the MACs and number of parameters very quickly).

The structure of an IBN block 402 within MobileNetV2 is shown in detail in FIG. 4. As shown, the IBN block 402 first expands input features (from M channels) to a larger number of intermediate features (ExM channels). Then it does Batch Norm (BN) which is a linear normalization procedure on the intermediate features. This is followed by a ReLU which is a non-linear activation function (ReLU(x)

=max (0, x)). Then, a 3×3 DSConv does feature extraction, which is followed by another round of BN and ReLU. The expanded intermediate features are finally projected to a small number of features (say N channels).

MobileNetV2 network has two types of IBN blocks: residual and non-residual IBN blocks. A "residual" block is where the input channels are added to the output of a given block. However, not all IBN blocks have a residual connection. For instance, if the size of input and output maps are not equal (i.e., when height and width of maps are not equal due to convolution strides, or if number of input and output channels are not equal), the input channels cannot simply be added to the output, and so this is not done. In the case of a non-residual block, the IBN contains only the expansion 1×1 layer, a 3×3 DSConv, and a projection 1×1 layer.

In the present embodiments, at least some of these blocks are therefore replaced with 'reducible' inverted bottleneck blocks ("RIBN"s), as explained in more detail below.

Replacement 1: Non-Residual IBN with Single RIBN:

FIG. 5 shows the process of replacing a non-residual IBN, 402 with a single RIBN 502 that collapses into a single convolution layer 503 for execution.

As shown in FIG. 5, in order to transform the IBN block 402 into the RIBN block 502, the first BN+ReLU in the IBN block 402 is moved outside of the sequence of convolution operations defining the inverted bottleneck, and the second BN+ReLU is removed. Then, all of the BNs are placed after all convolutions in the block. This results in the expanded RIBN block 502 shown in FIG. 5 (center panel) which is used during the training process. This RIBN block 502 has a special property that because there is no non-linearity between the various convolutions, and because BN is also a linear operation, all of these operations can be analytically collapsed into a single, small 3×3 convolution layer 503 at inference time (see FIG. 5, right panel).

The expanded RIBN block 502 can thus be used within the neural network during the training phase. Once the training is complete however, the RIBN block 502 can be analytically collapsed into a single, small 3×3 convolution layer 503 at inference time that replicates (exactly) the processing result for the full expanded RIBN block 502.

Therefore, during inference, the reduced format version 503 of the RIBN block simply contains BN→ReLU-→Conv3×3, where the Conv3×3 layer is relatively small (as it does not expand the channels). Hence, the reduced format version 503 of the RIBN block will run faster than a similar size IBN at inference time due to the collapse of the sequence of processing operations into a single convolution operation. This therefore provides a more efficient execution. For example, in the case of NPU execution, this reduced format version 503 can be executed with significantly higher utilization of regular convolutions on NPUs than DSConv.

Note that in the RIBN block 502 an expansion factor E is applied during the training process. However, the expansion factor E gets collapsed at inference time. This also means that the RIBN blocks 502 can use much larger expansion factors (than traditional IBN blocks) without any penalty at inference time. This can therefore facilitate an improved training process.

For instance, in IBNs for MobileNetV2, the expansion factor E is set to 6. However, since the expansion factor E does not affect the inference performance of the RIBN block 502, it can be set to a much larger value (e.g., E=12). The idea is to train a significantly larger network that achieves high accuracy, but at inference time, collapses into a very efficient, hardware-aware network.

Replacement 2: Residual IBN with Two RIBNs Connected within a Residual Block:

When the IBN block has a residual connection, it means that its input and output channels are equal (and their height and width are also equal). In this case, the present embodiment replaces the convolutions in IBN with two RIBN blocks connected within a ResNetV2 residual block 603. This is illustrated in FIG. 6.

Figure 6:
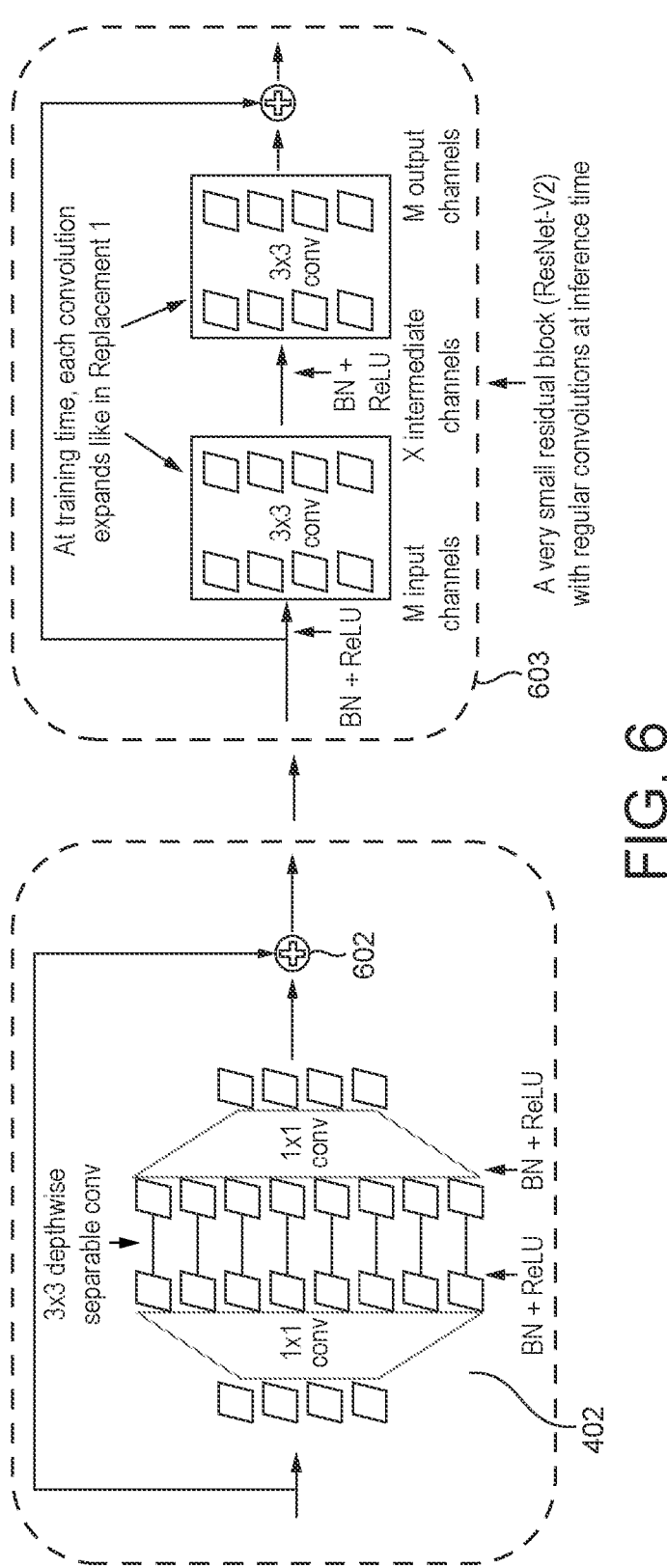
FIG. 6 shows another example of a block that may be used within a neural network according to an embodiment.

Note that, during training, the 3×3 convolutions shown in FIG. 6 are expanded as described in Replacement 1 above. As usual, the RIBNs are collapsed into small regular convolutions at inference time. Moreover, in traditional residual blocks, the number of channels is same across all layers within the block. This requirement can be relaxed in order to achieve greater computational efficiency: there may be X (X<=M) intermediate channels within the block.

Therefore, at inference time, the RIBN-based residual block collapses into a reduced format block 603 comprising the following sequence of operations: BN→ReLU-→Conv3×3→BN→ReLU→Conv3×3, followed by a residual addition operation 602. Note that this is equivalent to a ResNetV2 residual block.

Reducible Output Block

The present Applicants have also recognised that the final layers of MobileNetV2 can represent another performance pinch point due to the size of these layers. Thus, in the present embodiment, the last two layers of MobileNetV2 are replaced with a single, small fully connected layer (at inference time). Again, during training, a combination of larger layers is trained which is analytically collapsed into a single, small layer at inference time. This is shown in FIG. 7.

Replacement 3: Replacing the Last Two (Expensive) Layers from MobileNet-V2 with a Single Fully Connected Layer The final layers in MobileNetV2 are very expensive since they involve a large 1×1 convolution expanding channels from 320 to 1280, and a large fully connected layer performs classification between 1000 classes (see FIG. 7, top left panel).

Figure 7:
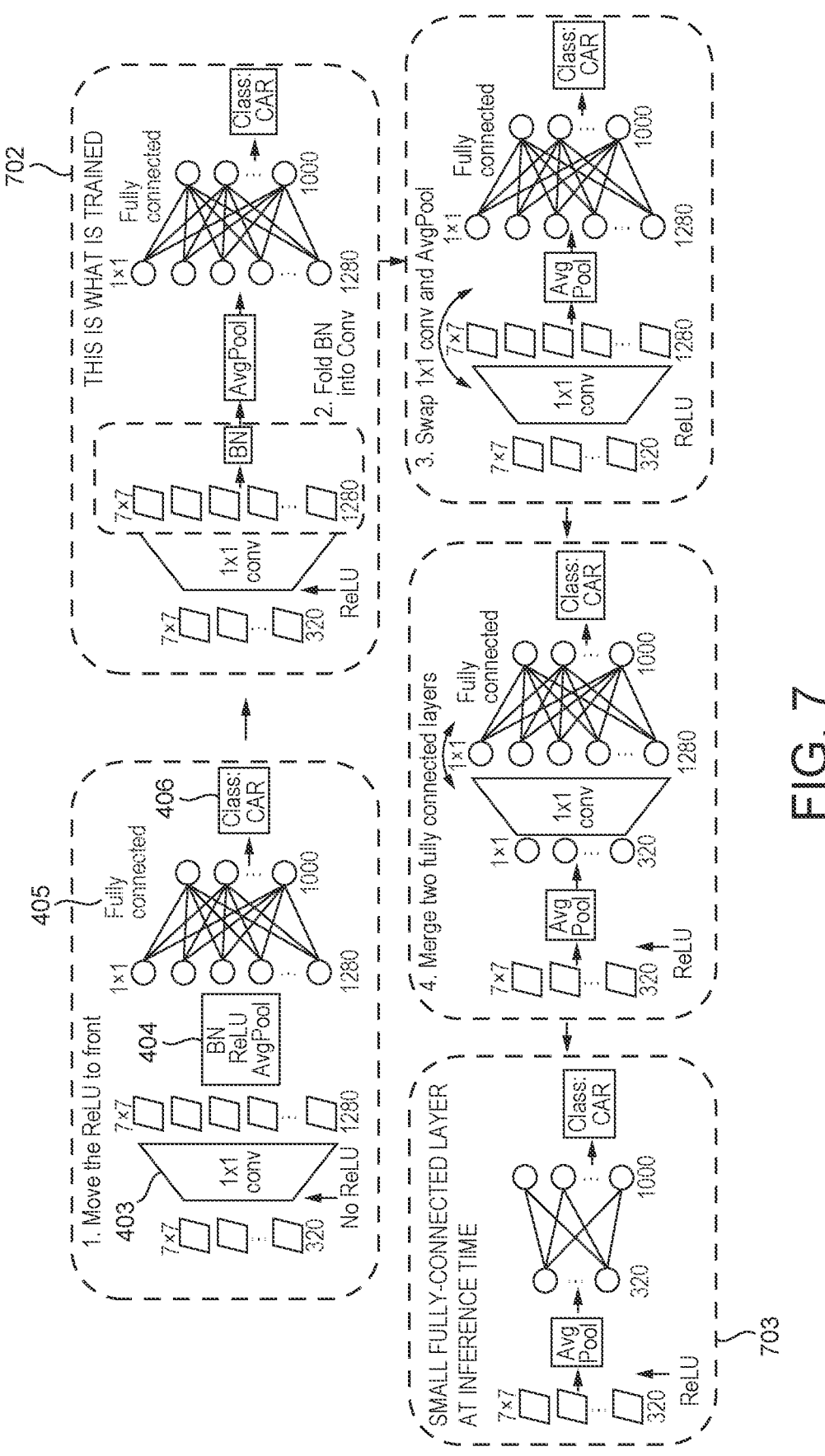
FIG. 7 shows an example of the final layers within a neural network according to an embodiment.

FIG. 7 illustrates the replacement process in detail. This is done by first moving the ReLU to the front of the 1×1 convolution. This again results in non-linearity appearing first, and the renders rest of the operations linear. This block 702 is what is then trained. The linearity of all operations can again be exploited to collapse these layers at execution time into a single, small fully connected layer 703, in a similar manner as described above for the first two replacements.

Essentially, the BN can be folded into convolution weights due to its linearity. Then, because the convolution kernel size is 1×1, this can be analytically swapped with the average pool layer (which just averages out the 7×7 channels) and the 1×1 convolution. This means that the 1×1 convolution is now equivalent to a fully connected layer and both layers can thus be merged together (since a result of two matrix multiplications (W320×1280 and W1280×1000) can be replaced by a single, much smaller matrix multiplication: W320×1000=W320×1280 and W1280×1000).

Therefore, the model used during training is shown in FIG. 7, top right. The training time model analytically collapses into a significantly smaller inference time fully connected layer 703 (FIG. 7, bottom left).

It will be appreciated from the above discussion that the present embodiments advantageously train a larger version of the neural network, but then reduce the network for execution. FIG. 8 is a flowchart showing this overall process.

As shown in FIG. 8, the process thus comprises a first step of training a first version of the neural network, in full, to perform a desired neural network processing task (step 800). Once the training is complete, at least some processing blocks in the first version of the neural network are however then replaced (as described above) with reduced format blocks for execution (step 801).

The reduced format version of the neural network is then provided for output (for execution) (step 802). An executable model is thus generated that includes the reduced format version of the neural network (as well as suitable neural network parameters (weights) for the neural network). The model can then be executed as desired to perform neural network processing tasks (step 803). For example, the model may be trained to perform an image classification task. The trained model may then be deployed and executed as desired on an input image in order to perform the classification task. Various other arrangements would of course be possible.

Neural Architecture Search Algorithm (NAS)

In order to determine which blocks can be replaced in this way, there is also provided an automatic lightweight, hardware-aware NAS algorithm that can be executed in order to determine where to place IBN blocks and where to use RIBN blocks within a model.

For instance, with the above replacement techniques, the Applicants have found that it is possible to design new neural network model that can achieve similar accuracies to MobileNetV2, but that can be executed much more efficiently, e.g., and especially, using hardware accelerators, such as NPUs. This is because the model includes regular 3×3 convolution layers (which have high MAC utilization on NPUs), and also removes other performance bottlenecks faced by MobileNetV2. Furthermore, compared to existing networks using regular 3×3 convolutions (such as ResNetV2), this accuracy can be achieved using a much more compact network. This therefore represents a significant improvement in the art.

Note that, DSConv layers, pre-trained MobileNetV2 model, and IBN blocks (and their variants) have been heavily used as a foundation for many other deep neural networks for a wide variety of computer vision applications (e.g., object detection, semantic segmentation, depth estimation, image de-blurring, pose estimation, video understanding, etc.). Hence, providing a more optimised network that replaces some of the hardware inefficiencies in the existing MobileNetV2 model is beneficial for many applications.

On the other hand, hardware-aware NAS techniques automatically design hardware-efficient networks by performing a search over a certain space of operators. One important limitation of these NAS works is that they are heavily limited by their search space. That is, if they are searching over a space of operators which are not optimized for a given target hardware (e.g., DSConv for NPUs), or are optimized for hardware, but cannot achieve high accuracy (e.g., traditional 3×3 convolutions which do not achieve high accuracy unless the model size is prohibitively increased), then the NAS will result in sub-optimal neural network architectures.

Therefore, from a NAS perspective, the replacements described above can serve as a part of a novel search space to design neural network structures that are better optimised for execution by the available processing resource. To do this, the present Applicants have also developed a novel NAS algorithm that provides a trainable way of automatically selecting between IBN blocks and RIBN blocks.

For instance, the present Applicants have found that some of the IBN blocks in MobileNetV2 are more critical than others for achieving higher accuracy performance. In that case, it is desirable to be able to determine when designing a new model where to optimally put IBNs, and where to put RIBNs. The hardware-aware NAS algorithm discussed below allows this to be determined automatically, as part of a one-shot training process.

In the replacements described above, note that in order to convert a block from a traditional IBN into a novel RIBN, the ReLUs are moved around in order to move the non-linearity outside of the convolution operations. The main difference between IBN and RIBN is thus that IBN has ReLU non-linearity in the expanded space (i.e., the layers with ExM channels), whereas RIBN has ReLU only before the convolution layers and is completely linear in the expanded space.

In order to select between ReLU (traditional IBN) or linearity (RIBN), the proposed NAS algorithm thus makes use of another non-linear function called Parametric ReLU (PRELU) which is expressed as follows:

$$y = \begin{bmatrix} x & \text{if } x \ge 0 \\ a.\,x & \text{if } x < 0, \quad a \in \mathbb{R} \end{bmatrix}$$

Here, 'a' is a trainable parameter that can take any value and is learned during the training process. This can be used therefore to select between the traditional IBN and novel RIBN blocks.

Figure 9:
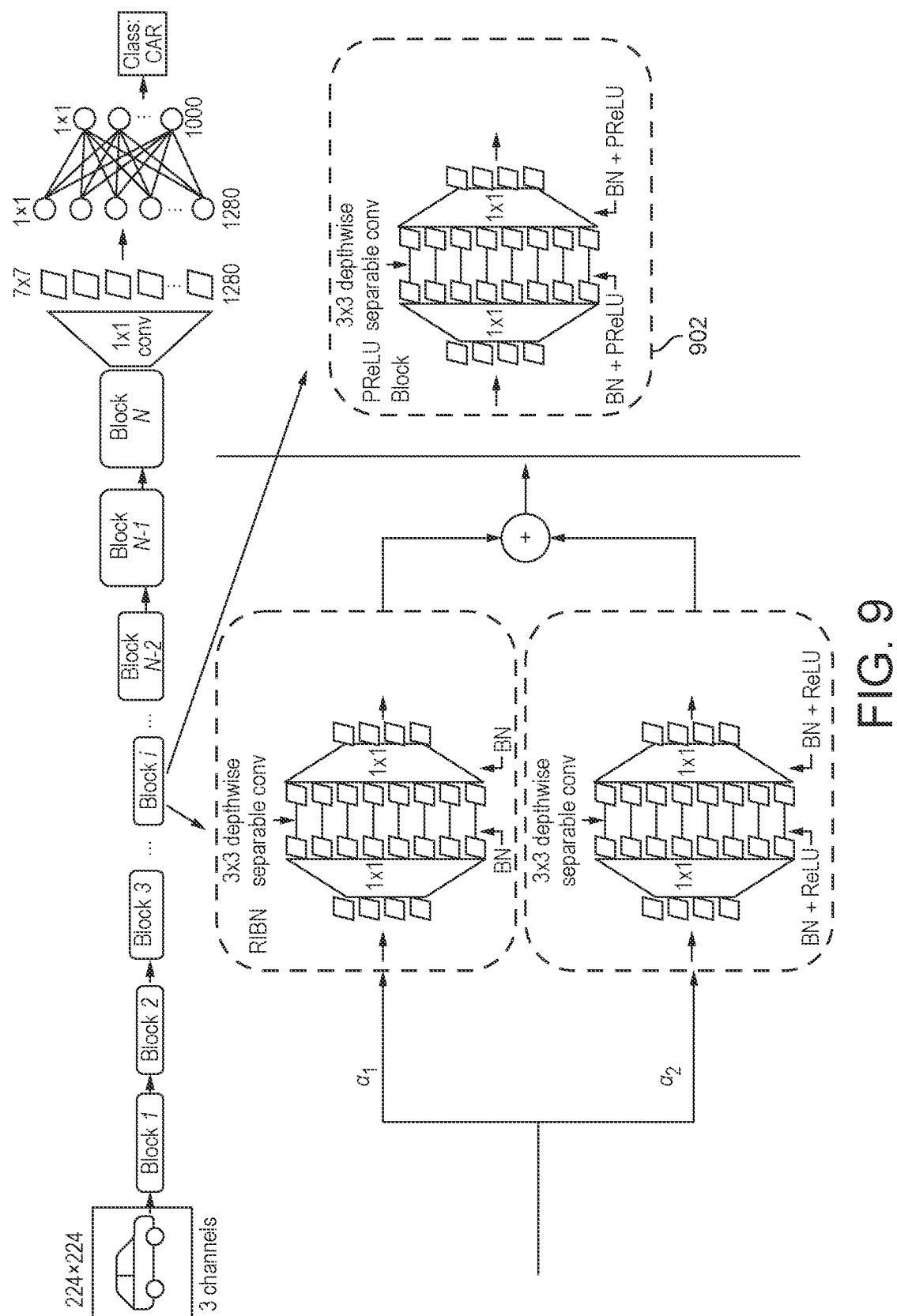
FIG. 9 illustrates the construction of a neural network according to an embodiment.

The structure of a NAS block that can select between IBN and RIBN is shown in FIG. 9. As shown in FIG. 9, the NAS block contains PRELU at the beginning of the block, and two other PReLUs at intermediate expanded features (after the first 1×1 and the 3×3 DSConv). Thus, if a=0, then a PRELU is equivalent to a ReLU function (y=max (0,x)), and if a=1, then it is equivalent to a linear line y=x. Therefore, PRELU can be used to select between a ReLU and linear line.

Essentially, during NAS training, if the parameter "a" is constrained to become either 0 or 1, and additionally, constrained such that the parameter "a" for both PReLUs in the intermediate expanded features have the same value (i.e., either 0 or 1), then this will either select between an IBN or an RIBN block automatically. Therefore, the lightweight NAS method illustrated in FIG. 9 exploits PReLUs as a trainable way to directly select between the two kinds of blocks in one-shot.

Specifically, a NAS problem can be formulated as follows:

$$\min_{W,a} \mathcal{H}(y, f(x)) + \mathbb{S}(a == 1 \parallel a == 0) + \mathcal{L}(f, T)$$

where, y is the true label for the dataset, f(x) is the output of CNN on input x, H refers to the cross-entropy loss for the classification problem, I is an indicator function which becomes 0 only if a (PRELU parameter) is either 0 or 1 and is a large value otherwise. L is the Latency Loss, a common loss function used in NAS [3] to keep the latency of model f within some threshold T. Also, W is the set of trainable weights, and a is the set of all PRELU "a" parameters.

The objective of the indicator function is to push all "a" parameters towards either 0 or 1 in order to select between IBN and RIBN blocks. Note that, the latency loss function used in common NAS frameworks uses differentiable latency predictors (e.g., neural networks trained to predict latency of a given model on certain target hardware). The purpose of this latency loss is to guide the search towards hardware-aware models. For instance, for a CPU target, the NAS should automatically go towards less-MACs IBN blocks, whereas for NPUs, it should push the model towards RIBN blocks which collapse into small 3×3 convolutions without increasing MACs and number of parameters prohibitively (and thus result in higher MAC unit utilization). The NAS formulation is therefore "hardware-aware" as it encodes both IBN and RIBN-leading candidates for hardware-aware models-into the search space with a simple PRELU parameterization. Moreover, this approach is one-shot NAS since it will directly converge into a model containing both IBN and RIBN at appropriate places.

Figure 10:
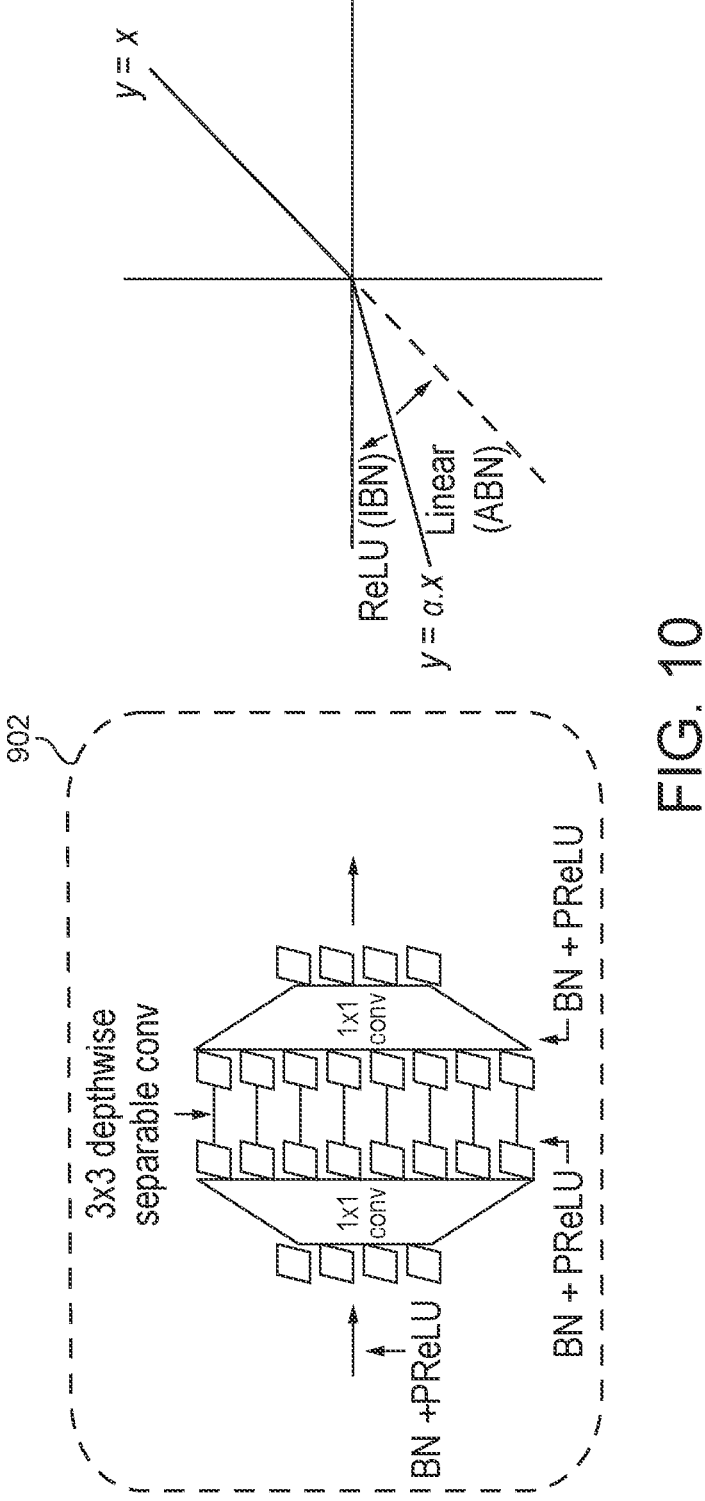
FIG. 10 shows an example block that can be used for the construction of a neural network according to an embodiment.

FIGS. 9 and 10 illustrate the NAS process for selecting between IBN and RIBN blocks. In particular, FIG. 10 shows the form of a NAS block that can select between IBN or RIBN blocks. The NAS block 902 uses Parametric ReLUs (PReLUs) as activation functions instead of just linear convolutions or ReLUs. FIG. 10 also shows the shape of PRELU activation function.

During NAS training, the parameter a in PRELU is constrained to take either the value 0 or 1. Thus, if a=0, then the PRELU becomes a ReLU function (y=max (0,x)), and if a=1, then PRELU becomes a linear line y=x.

In the latter case, if both PReLUs between convolutions have a=1, then the NAS block can be collapsed into a single 3×3 convolution layer, just like the RIBN block. Indeed, additional constraints may be enforced. For instance, if the parameter a in PRELU becomes 0 at either of the intermediate layers (e.g., after the first 1×1 convolution, or after the 3×3 DSConv), then the other must also become 0, thus automatically selecting an IBN block. Similarly, both must be 1 if one of them becomes 1, thus selecting the RIBN block (this cannot work if there is even a single non-linearity between convolutions). Therefore, the NAS method directly selects between IBN and RIBN blocks.

Figure 11:
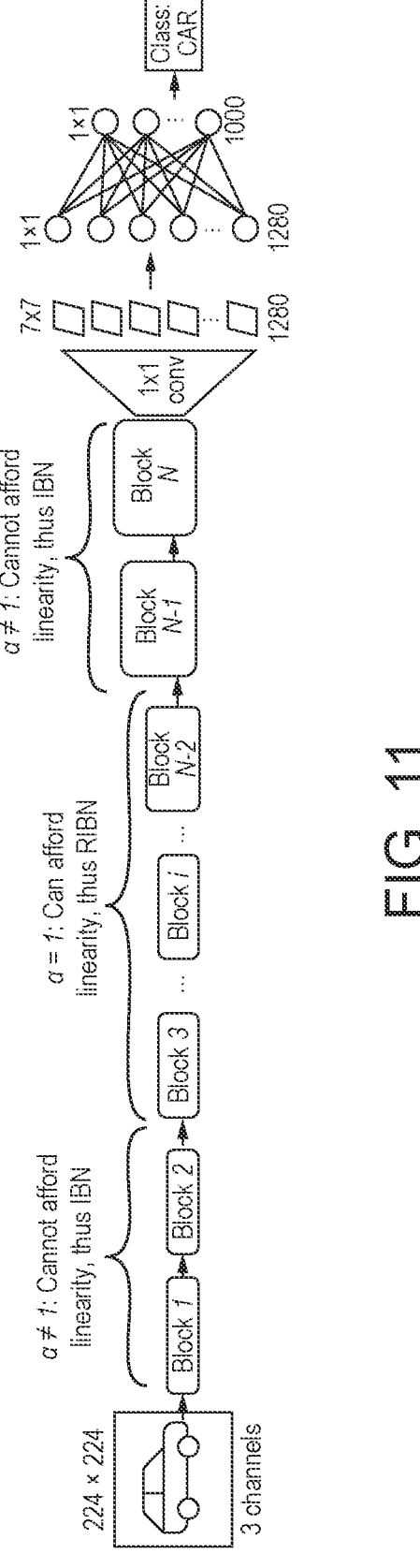
FIG. 11 shows an example of a neural network according to an embodiment.

The NAS training process can thus be executed appropriately in order to determine which types of blocks should be provided at which positions. FIG. 11 shows schematically the result of this, in one example, where it was found that the first two bottleneck blocks, and also the final two bottleneck blocks, were most critical for accuracy, such that the NAS process determined that traditional IBN blocks (with non-linearity) should be used at those positions. The NAS process however determined that the other blocks can afford linearity, such that RIBN blocks can be used at these positions.

FIG. 12 shows the NAS training process. The NAS process starts by creating a neural network including the NAS blocks (step 1200). The neural network is then trained based on the PRELU constraints and desired hardware constraints, as discussed above (step 1201). The neural network is then parsed block by block (step 1202) and so long as the end is not reached (step 1203) the PRELU parameter a is then checked (step 1204), and the block selection made appropriately.

Thus, if the first PRELU parameter is '1' but the second and third PRELU parameters are '0' (i.e. a=[1,0,0]), the a=0 PReLUs can be replaced with ReLUs and the a=1 PRELU can be removed. The resulting block is then equivalent to a traditional IBN block (step 1205).

On the other hand, if the first PRELU parameter is '0' but the second and third PRELU parameters are '1' (i.e. a=[0, 1,1]), the a=0 PRELU can be replaced with a ReLU and the remaining linear convolutions can be collapsed into a small k×k convolution (step 1206). This is repeated until all of the blocks have been processed to give the final inference network (step 1207).

It will be appreciated that the above example merely illustrates one example of a NAS training process according to an embodiment of the technology described herein and that other suitable parameterizations may be used for this purpose. For example, rather than using a PReLU function that is constrained to a=0 or 1, the PRELU function could be constrained to, e.g., a=1. The training (optimisation) would then try to force all of the a parameters to become '1'. In that case, if some of the values did not converge, this may indicate that, those blocks cannot be collapsed, i.e. it is important to retain non-linearity. In that case those blocks should be set appropriately to include some non-linearity, e.g. by including a ReLU function as in a traditional IBN block (or any other suitable non-linear activation function as desired).

The present Applicants thus propose new neural network architectures that in embodiments are similar to Mobile-NetV2-like networks but in which most of the IBN blocks are replaced with newly designed reducible, RIBN blocks, as described above. The RIBN blocks train three linear convolution layers that can be analytically collapsed into small, regular 3×3 convolutions at inference, without losing accuracy, as well as without prohibitively increasing model size and MACs. The present Applicants also propose another technique to replace the last two layers of MobileNetV2 with a single, small fully connected layer. Again, during training, a combination of two large layers is trained which is analytically collapsed into a small layer at inference.

Moreover, the present Applicants have also developed an automatic lightweight, hardware-aware NAS algorithm to find where to place IBN blocks and where to use RIBN blocks within a model. This algorithm in an embodiment relies on a PRELU activation function to automatically select between the two types of blocks.

Using these techniques, the present Applicants have created various new neural network models which have been found to achieve relatively higher accuracies whilst also improving execution performance when executed on typical NPUs (e.g. such as the Arm Ethos-U55 NPU).

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of generating a model that can be executed by a processor to perform neural network processing, the method comprising:

providing a neural network, the neural network including a plurality of layers that are together arranged to process an input to the neural network to generate a respective output, wherein the neural network comprises a number of blocks, each block comprising one or more layers of the neural network, and each block configured to perform a respective sequence of processing operations;

training the neural network to perform a neural network processing task, wherein training the neural network comprises training a first version of the neural network, the first version of the neural network including one or more blocks in a first format, wherein each block in the first format comprises a respective sequence of processing operations;

after training the first version of the neural network:

replacing one or more of the first format blocks in the trained neural network with corresponding blocks in a second, different format to generate a second version of the neural network for execution, the second version of the neural network thus including a respective one or more blocks in the second format, wherein the blocks in the second format when executed replicate the result of the sequence of processing operations for the corresponding first format blocks in the trained neural network; and providing for output an executable model comprising the second version of the neural network including the one or more blocks in the second format, wherein the neural network includes one or more inverted bottleneck blocks that in the first format are configured to perform a sequence of convolution operations that take a set of k input features, expand the set of k input features to a higher dimension, perform a depthwise separable convolution in the higher dimension, and then reduce the features from the higher dimension to a set of k' output features, and that can be replaced with second, reduced format convolution blocks for execution, wherein the second format versions of the blocks comprise a reduced sequence of convolution operations that process a set of k input features into a set of k' output features without expanding the features to a higher dimension.

2. The method of claim 1, wherein the model is designed for execution by a hardware accelerator, the hardware accelerator being configured to optimally perform certain types of operations, and wherein the blocks in the second format comprise respective sets of one or more operations of a type that the hardware accelerator is optimised to perform.

3. The method of claim 1, wherein the inverted bottleneck blocks further comprise, in both formats, a non-linear activation function that is applied separately and outside of the sequence of convolution operations within the inverted bottleneck block.

4. The method of claim 3, wherein the non-linear activation function comprises a rectified linear unit (ReLU) activation function.

5. The method of claim 1, wherein the neural network in the first format comprises one or more inverted bottleneck blocks that comprise a set of parametrised activation functions, wherein training the first version of the neural network including the blocks in the first format comprises determining by the training a set of parameters for the parametrised activation functions, with the parameters for the parametrised activation functions indicating whether or not the inverted bottleneck block can be replaced with a corresponding second format version of the block for execution; and wherein the method further comprises determining which blocks in the first format to replace based on the determined parameters for the parametrised activation functions.

6. The method of claim 5, wherein the parametrised activation functions are parametrised rectified linear unit (PReLU) functions, and wherein the parameters are constrained to a first value indicating that the block can be replaced with a corresponding second format version of the block for execution and a second value indicating that the block should not be replaced for execution.

7. The method of claim 1, wherein the neural network comprises an output block that in the first format comprises a sequence of operations including expanding a set of m input features to a higher dimension, performing a pooling operation in the higher dimension, and then performing a fully connected layer in the higher dimension to give a set of m' output features, and that is replaced by a second, reduced format output block for execution, the second format output block comprising performing a pooling operation and then performing a fully connected layer that processes a set of m input features into a set of m' output features.

8. The method of claim 1, further comprising, subsequently to the step of providing for output an executable model comprising the second version of the neural network including the one or more blocks in the second format: executing the model to perform a neural network processing task.

9. The method of claim 8, wherein the step of executing the model to perform a neural network processing task is performed at least in part using a hardware accelerator, wherein the hardware accelerator comprises a plurality of multiply-accumulate circuits, and wherein the hardware accelerator is configured to execute the blocks in the second format with a higher utilisation of the hardware accelerator's multiply-accumulate circuits compared to the blocks in the first format.

10. A method of generating a model that can be executed by a processor to perform neural network processing, the method comprising:

providing a neural network, the neural network including a plurality of layers that are together arranged to process an input to the neural network to generate a respective output, wherein the neural network comprises a number of blocks, each block comprising one or more layers of the neural network, and each block configured to perform a respective sequence of processing operations;

training the neural network to perform a neural network processing task, wherein training the neural network comprises training a first version of the neural network, the first version of the neural network including one or more blocks in a first format, wherein each block in the first format comprises a respective sequence of processing operations;

after training the first version of the neural network: replacing one or more of the first format blocks in the trained neural network with corresponding blocks in a second, different format to generate a second version of the neural network for execution, the second version of the neural network thus including a respective one or more blocks in the second format, wherein the blocks in the second format when executed replicate the result of the sequence of processing operations for the corresponding first format blocks in the trained neural network; and providing for output an executable model comprising the second version of the neural network including the one or more blocks in the second format, wherein the neural network in the first format comprises one or more inverted bottleneck blocks that comprise a set of parametrised activation functions, wherein training the first version of the neural network including the blocks in the first format comprises determining by the training a set of parameters for the parametrised activation functions, with the parameters for the parametrised activation functions indicating whether or not the inverted bottleneck block can be replaced with a corresponding second format version of the block for execution; and wherein the method further comprises determining which blocks in the first format to replace based on the determined parameters for the parametrised activation functions.

11. The method of claim 10, wherein the parametrised activation functions are parametrised rectified linear unit (PRELU) functions, and wherein the parameters are constrained to a first value indicating that the block can be replaced with a corresponding second format version of the block for execution and a second value indicating that the block should not be replaced for execution.

12. The method of claim 10, further comprising, subsequently to the step of providing for output an executable model comprising the second version of the neural network including the one or more blocks in the second format: executing the model to perform a neural network processing task.

13. The method of claim 12, wherein the step of executing the model to perform a neural network processing task is performed at least in part using a hardware accelerator, wherein the hardware accelerator comprises a plurality of multiply-accumulate circuits, and wherein the hardware accelerator is configured to execute the blocks in the second format with a higher utilisation of the hardware accelerator's multiply-accumulate circuits compared to the blocks in the first format.

14. A method of generating a model that can be executed by a processor to perform neural network processing, the method comprising:

providing a neural network, the neural network including a plurality of layers that are together arranged to process an input to the neural network to generate a respective output, wherein the neural network comprises a number of blocks, each block comprising one or more layers of the neural network, and each block configured to perform a respective sequence of processing operations;

training the neural network to perform a neural network processing task, wherein training the neural network comprises training a first version of the neural network, the first version of the neural network including one or more blocks in a first format, wherein each block in the first format comprises a respective sequence of processing operations;

after training the first version of the neural network: replacing one or more of the first format blocks in the trained neural network with corresponding blocks in a second, different format to generate a second version of the neural network for execution, the second version of the neural network thus including a respective one or more blocks in the second format, wherein the blocks in the second format when executed replicate the result of the sequence of processing operations for the corresponding first format blocks in the trained neural network; and providing for output an executable model comprising the second version of the neural network including the one or more blocks in the second format, wherein the neural network comprises an output block that in the first format comprises a sequence of operations including expanding a set of m input features to a higher dimension, performing a pooling operation in the higher dimension, and then performing a fully connected layer in the higher dimension to give a set of m' output features, and that is replaced by a second, reduced format output block for execution, the second format output block comprising performing a pooling operation and then performing a fully connected layer that processes a set of m input features into a set of m' output features.

15. The method of claim 14, further comprising, subsequently to the step of providing for output an executable model comprising the second version of the neural network including the one or more blocks in the second format: executing the model to perform a neural network processing task.

16. The method of claim 15, wherein the step of executing the model to perform a neural network processing task is performed at least in part using a hardware accelerator, wherein the hardware accelerator comprises a plurality of multiply-accumulate circuits, and wherein the hardware accelerator is configured to execute the blocks in the second format with a higher utilisation of the hardware accelerator's multiply-accumulate circuits compared to the blocks in the first format.

*     *     *     *     *